(12) United States Patent
Sokol et al.

(10) Patent No.: US 11,937,556 B2
(45) Date of Patent: Mar. 26, 2024

(54) CHANNEL-LESS DRIP IRRIGATION EMITTERS AND METHODS OF USING THE SAME

(71) Applicant: MASSACHUSETTS INSTITUTE OF TECHNOLOGY, Cambridge, MA (US)

(72) Inventors: Julia Sokol, Cambridge, MA (US); Jaya Narain, Santa Clara, CA (US); Amos Greene Winter, V, Somerville, MA (US); Jeffrey Costello, Brighton, MA (US); Dheekshita Kumar, East Walpole, MA (US); Tristan J. McLaurin, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 67 days.

(21) Appl. No.: 17/402,234

(22) Filed: Aug. 13, 2021

(65) Prior Publication Data
US 2022/0046870 A1    Feb. 17, 2022

Related U.S. Application Data

(60) Provisional application No. 63/065,481, filed on Aug. 13, 2020.

(51) Int. Cl.
*A01G 25/02*    (2006.01)

(52) U.S. Cl.
CPC .................................. *A01G 25/023* (2013.01)

(58) Field of Classification Search
CPC ............................... A01G 25/02; A01G 25/023
See application file for complete search history.

(56) References Cited

U.S. PATENT DOCUMENTS 2,460,647 A    2/1949  Miller
4,307,841 A  * 12/1981 Mehoudar ............ A01G 25/023
                                                        239/542
(Continued)

FOREIGN PATENT DOCUMENTS

AU           633097 B2    1/1993
CN        106777589 A     5/2017
(Continued)

OTHER PUBLICATIONS

Zhang, J., et al., "New Method of Hydraulic Performance Evaluation on Emitters with Labyrinth Channels," J. Irrig. Drain. Eng., 137(12), pp. 811-815, 2011.
(Continued)

*Primary Examiner* — Joseph A Greenlund
(74) *Attorney, Agent, or Firm* — Barnes & Thornburg LLP

(57) ABSTRACT

Drip irrigation emitters having low activation pressures, desirable flow rates, and are configured to clog less than existing emitters are provided. The disclosed emitters include membrane cavities that are devoid of a channel and a land to help advance fluid through the cavity, to an outlet, and to an outside environment. Instead, the membrane cavities have various shapes and configurations that, in conjunction with a depressed membrane, help to drive fluid out of the membrane cavity and to an outside environment. The shapes of the membrane cavities include a sinusoidal configuration, a cylindrical shape configuration, and a flat bottom configuration. Various features of such emitters, and methods of using the same, are also provided.

18 Claims, 13 Drawing Sheets

(56) References Cited

U.S. PATENT DOCUMENTS

| | | | |
|---|---|---|---|
| 4,573,640 A * | 3/1986 | Mehoudar | A01G 25/02 239/542 |
| 4,589,595 A | 5/1986 | Havens | |
| 5,413,282 A * | 5/1995 | Boswell | A01G 25/023 239/542 |
| 5,609,303 A * | 3/1997 | Cohen | A01G 25/023 239/542 |
| 5,711,482 A | 1/1998 | Yu | |
| 5,794,849 A | 8/1998 | Elder | |
| 5,813,603 A | 9/1998 | Kurtz | |
| 8,511,585 B2 * | 8/2013 | Keren | A01G 25/023 239/533.1 |
| 8,511,586 B2 | 8/2013 | Einav et al. | |
| 8,870,098 B2 * | 10/2014 | Lutzki | F16K 23/00 239/533.1 |
| 9,439,366 B2 * | 9/2016 | Kidachi | A01G 25/023 |
| 9,872,444 B2 * | 1/2018 | Turk | A01G 25/023 |
| 10,426,104 B2 | 10/2019 | Shamshery et al. | |
| 10,517,236 B2 * | 12/2019 | Keren | A01G 25/023 |
| 2005/0284966 A1 * | 12/2005 | DeFrank | A01G 25/023 239/542 |
| 2007/0108318 A1 * | 5/2007 | Mamo | A01G 25/023 239/542 |
| 2010/0155508 A1 * | 6/2010 | Keren | A01G 25/023 239/542 |
| 2012/0097254 A1 * | 4/2012 | Cohen | A01G 25/02 137/67 |
| 2012/0305676 A1 * | 12/2012 | Keren | A01G 25/023 239/542 |
| 2015/0090815 A1 | 4/2015 | Akritanakis | |
| 2015/0150199 A1 * | 6/2015 | Kidachi | A01G 25/023 239/542 |
| 2016/0219803 A1 * | 8/2016 | Keren | B05B 1/30 |
| 2017/0142916 A1 | 5/2017 | Shamshery et al. | |
| 2018/0098514 A1 * | 4/2018 | Socolsky | A01G 25/023 |
| 2018/0168117 A1 * | 6/2018 | Noguchi | A01G 25/16 |
| 2019/0183074 A1 * | 6/2019 | Morikoshi | F04B 43/02 |
| 2020/0288653 A1 * | 9/2020 | Socolsky | A01G 25/023 |
| 2021/0037726 A1 * | 2/2021 | Yanagisawa | A01G 27/00 |
| 2022/0046869 A1 * | 2/2022 | Sokol | A01G 25/023 |
| 2022/0046870 A1 * | 2/2022 | Sokol | A01G 25/023 |

FOREIGN PATENT DOCUMENTS

| | | |
|---|---|---|
| EP | 3305065 A1 | 4/2018 |
| ES | 2229889 B1 | 7/2006 |
| WO | 1984002828 A1 | 8/1984 |

OTHER PUBLICATIONS

Zhang, J., et al., "Structural Optimization of Labyrinth-Channel Emitters Based on Hydraulic and Anti-Clogging Performances," Irrig. Sci., 29(5), pp. 351-357, 2011.

Zhangzhong, L., et al., "Flow Characteristics and Pressure-Compensating Mechanism of Non-Pressure-Compensating Drip Irrigation Emitters," Irrig. Drain., 64(5), pp. 637-646, 2015.

Zhao, W., et al., "Research on Transitional Flow Characteristics of Labyrinth Channel Emitter," IFIP Int. Fed. Inf. Process., 294, pp. 881-890, 2009.

Al-Amoud, A. I., et al., "Impact of Water Temperature and Structural Parameters on the Hydraulic Labyrinth-Channel Emitter Performance," Spanish J. Agric. Res., 12(3), pp. 580-593, 2014.

Al-Muhammad, J., et al., "Modeling a Weak Turbulent Flow in a Narrow and Wavy Channel: Case of Micro-irrigation," Irrig. Sci., 34(5), pp. 361-377, 2016.

Bernstein, L., et al., "Comparisons of Drip, Furrow, and Sprinkler Irrigation," Soil Sci., 115(1), pp. 73-86, 1973.

Burney, J., et al., "Solar-Powered Drip Irrigation Enhances Food Security in the Sudano-Sahel," Proc. Natl. Acad. Sci. U. S. A., 107(5), pp. 1848-1853, 2010.

Celik, H. K., et al., "Rapid Prototyping and Flow Simulation Applications in Design of Agricultural Irrigation Equipment: Case Study for a Sample in-Line Drip Emitter," Virtual Phys. Prototyp., 6(1), pp. 47-56, 2011.

Cetin, O., et al., "Effects of Different Irrigation Methods on Shedding and Yield of Cotton," Agric. Water Manag., 54(1), pp. 1-15, 2002.

ChinaDrip, 2020, "Drip Tape and Fitting" [Online]. Available: https://www.chinadrip.com/drip-tape-and-fitting_c31. [Accessed: Apr. 14, 2020].

Dazhuang, Y., et al., "Numerical Study on Flow Property in Dentate Path of Drip Emitters," New Zeal. J. Agric. Res., 5007, pp. 705-712, 2007.

Edwards, M. F., et al., "Head Losses in Pipe Fittings at Low Reynolds Numbers," Chem. Eng. Res. Des., 63(1), pp. 43-50, 1985.

Fao, The State of the World's Land and Water Resources for Food and Agriculture: Managing Systems at Risk, Rome, Italy, 2011.

Feng, J., et al., "Effect of Optimization Forms of Flow Path on Emitter Hydraulic and Anti-Clogging Performance in Drip Irrigation System," Irrig. Sci., 36(1), pp. 37-47, 2018.

Foley, J. A., et al., "Solutions for a Cultivated Planet," Nature, 478(7369), pp. 337-342, 2011.

Ghamarnia, H., et al., "Evaluation and Comparison of Drip and Conventional Irrigation Methods on Sugar Beets in a Semiarid Region," J. Irrig. Drain. Eng., 138(1), pp. 90-97, 2011.

Hanson, B. R., et al., "A Comparison of Furrow, Surface Drip, and Subsurface Drip Irrigation on Lettuce Yield and Applied Water," Agric. Water Manag., 33(2-3), pp. 139-157, 1997.

Ibragimov, N., et al., "Water Use Efficiency of Irrigated Cotton in Uzbekistan under Drip and Furrow Irrigation," Agric. Water Manag., 90(1-2), pp. 112-120, 2007.

ICID, Annual Report 2017-2018: Agricultural Water Management for Sustainable Rural Development, New Delhi, India, 2018.

Idelchik, I. E., "Handbook of Hydraulic Resistance," 4th Edition, 2007.

Indian Office Action for Application No. 201847022701, dated Nov. 27, 2020 (5 pages).

International Preliminary Report on Patentability for Application No. PCT/US2016/053686, dated May 31, 2018 (10 Pages).

International Search Report and Written Opinion for Application No. PCT/US2016/053686, dated Dec. 14, 2016 (12 Pages).

International Search Report and Written Opinion for Application No. PCT/US2021/045978, dated Nov. 16, 2021 (16 pages).

Jagermeyr, J., et al., "Water Savings Potentials of Irrigation Systems: Global Simulation of Processes and Linkages," Hydrol. Earth Syst. Sci., 19(7), pp. 3073-3091, 2015.

Jain Irrigation Systems Ltd., 2019, "Jain Turbo Cascade Pc, Pcnl & PCAS" [Online]. Available: https://www.jains.com/irrigation/emitting pipe/turbo cscade pc ponl pcas.htm. [Accessed: Apr. 14, 2020].

Li, Y., et al., "CFD and Digital Particle Tracking to Assess Flow Characteristics in the Labyrinth Flow Path of a Drip Irrigation Emitter," Irrig. Sci., 26, pp. 427-438, 2008.

Maisiri, N., et al., "On Farm Evaluation of the Effect of Low Cost Drip Irrigation on Water and Crop Productivity Compared to Conventional Surface Irrigation System," Phys. Chem. Earth, 30, pp. 783-791, 2005.

Mattar, M. A., et al., "Artificial Neural Networks for Estimating the Hydraulic Performance of Labyrinth-Channel Emitters," Comput. Electron. Agric., 114, pp. 189-201, 2015.

Mattar, M. A., et al., "Hydraulic Performance of Labyrinth-channel Emitters: Experimental Study, ANN, and GEP Modeling," Irrig. Sci., 2019.

Narain, J., et al., "A Hybrid Computational and Analytical Model of Inline Drip Emitters," J. Mech. Des., 141(7), p. 71405, 2019.

Narayanamoorthy, A., "Impact Assessment of Drip Irrigation in India: The Case of Sugarcane," Dev. Policy Rev., 22(4), pp. 443-462, 2004.

Netafim, 2020, "Heavywall Driplines" [Online]. Available: https://www.netafimusa.com/agriculture/products/product-offering/heavywall-driplines/. [Accessed: Apr. 14, 2020].

(56) References Cited

OTHER PUBLICATIONS

Nishimura, T., et al., "Flow Characteristics in Channel With Symmetric Wavy Wall for Steady Flow," Organ. by Korean Inst Chem. Eng., pp. 13-18, 1983.

Philipova, N., et al., "Mathematical Modeling of Drip Emitter Discharge of Triangular Labyrinth Channel," Comptes rendus l'Academie Bulg. des Sci., 64(1), 2011.

Philipova, N., et al., "Regression Equations of Pressure Losses of Rectangular Labyrinth Channel and Bi-Objective Optimization," Comptes rendus l'Academie Bulg. des Sci., 64(12), pp. 1749-1756, 2011.

Phocaides, A., Handbook on Pressurized Irrigation Techniques, Food and Agriculture Organization of the United Nations (FAO), Rome, Italy, 2007.

Postel, S., et al., "Drip Irrigation for Small Farmers: A New Initiative to Alleviate Hunger and Poverty," Water Int., 26(1), pp. 3-13, 2001.

Rainbird, 2020, "Drip Irrigation" [Online]. Available: https://www.rainbird.com/agriculture/products/drip-irrigation. [Accessed: Apr. 14, 2020].

Shamshery, P., et al., "Modeling the Future of Irrigation: A Parametric Description of Pressure Compensating Drip Irrigation Emitter Performance," PLoS One, 12(4), 2017.

Shamshery, P., et al., "Shape and Form Optimization of On-Line Pressure-Compensating Drip Emitters to Achieve Lower Activation Pressure," J. Mech. Des., 140, pp. 35001-35001-7, 2018.

Sokol, J., et al., "Energy Reduction and Uniformity of Low-Pressure Online Drip Irrigation Emitters in Field Tests," Water (Switzerland), 11(6), 2019.

Szilard, R., Theories and Applications of Plate Analysis, John Wiley & Sons, Inc., Hoboken, NJ, 2003.

Taylor et al., "A Mathematical Model for Pressure Compensating Emitters," Proceedings of the 2015 IDETC ASME 2015 International Design Engineering Technical Conference, pp. 1-10, New York, USA, 2015.

Tian, W., "A Review of Sensitivity Analysis Methods in Building Energy Analysis," Renew. Sustain. Energy Rev., 20, pp. 411-419, 2013.

Ventsel, E., et al., Thin Plates and Shells, Marcel Dekker, Inc., New York, NY, 2001.

Wang, L., et al., "Rapid Stereotype of Cylindrical Drip Emitter Based on Computational Fluid Dynamics and Rapid Prototyping Manufacturing," Appl. Mech. Mater., 190-191, pp. 390-394, 2012.

Wang, W., et al., "A Hydraulic Analysis of an Online Pressure Compensating Emitter Using CFD-CSD Technology," 2012 ASABE Annual International Meeting, 2012.

Wei, Q., et al., "Study on Hydraulic Performance of Drip Emitters by Computational Fluid Dynamics," Agric. Water Manag., 84(1-2), pp. 130-136, 2006.

Wei, Z., "The Step-by-Step CFD Design Method of Pressure-Compensating Emitter," Eng. Sci., 11(1), 2013.

Woltering, L., et al., "The Economics of Low Pressure Drip Irrigation and Hand Watering for Vegetable Production in the Sahel," Agric. Water Manag., 99(1), pp. 67-73, 2011.

Wu, D., et al., "Simulation of the Flow Characteristics of a Drip Irrigation Emitter with Large Eddy Methods," Math. Comput. Model., 58(3-4), pp. 497-506, 2013.

Yu, L., et al., "The Mechanism of Emitter Clogging Analyzed by CFD—DEM Simulation and PTV Experiment," Adv. Mech. Eng., 10(1), pp. 1-10, 2018.

\* cited by examiner

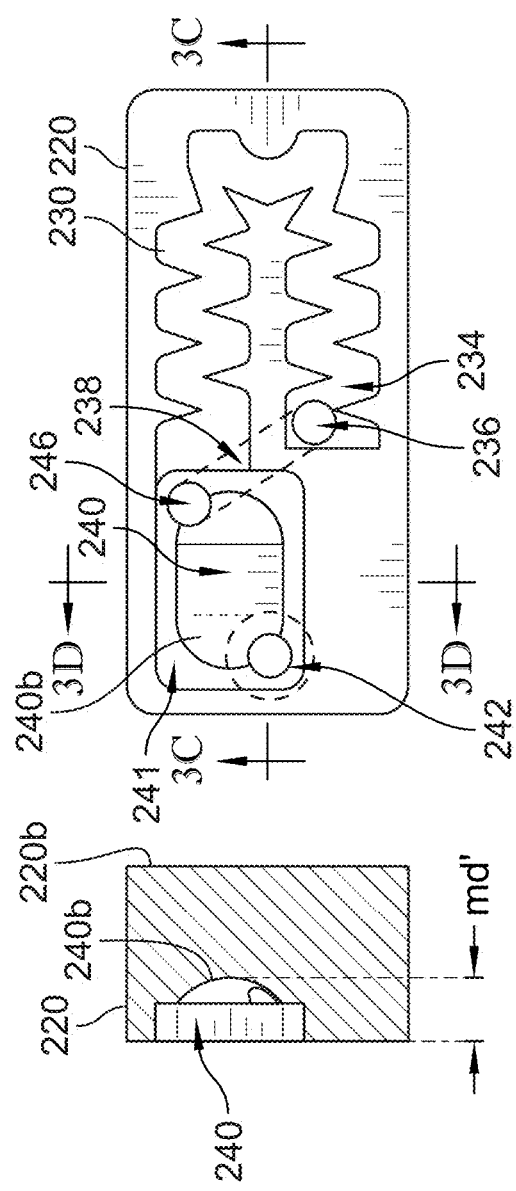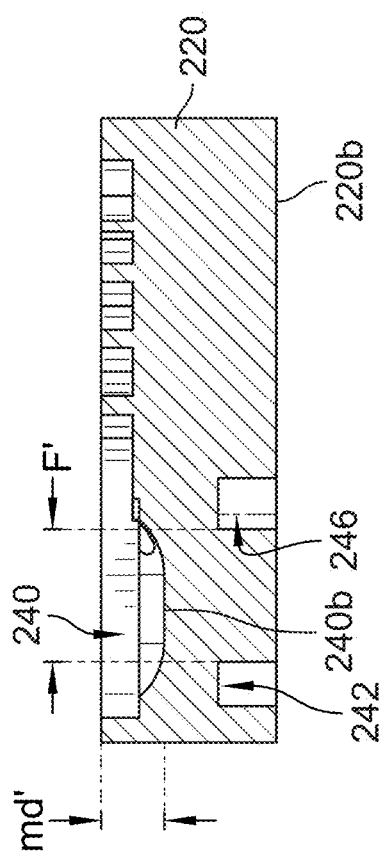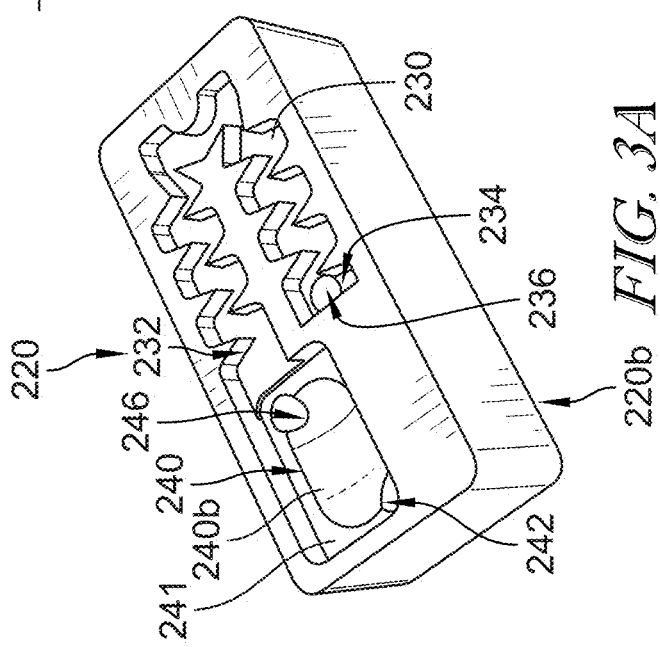

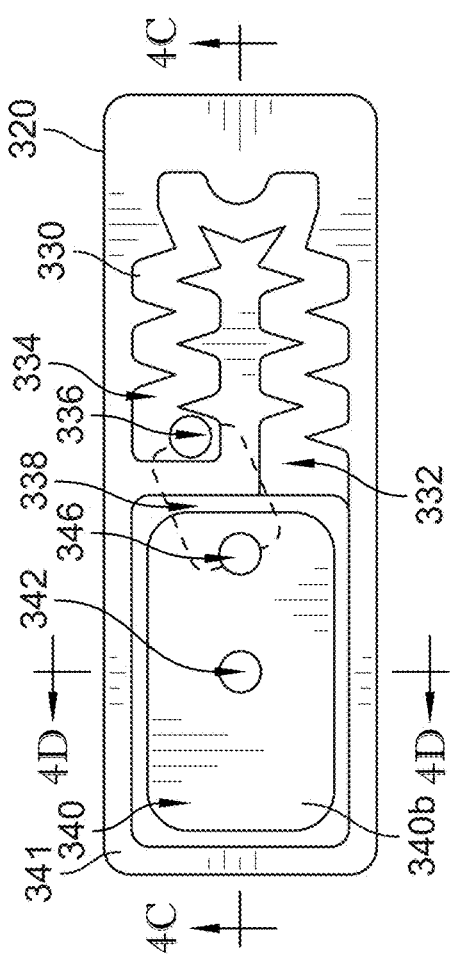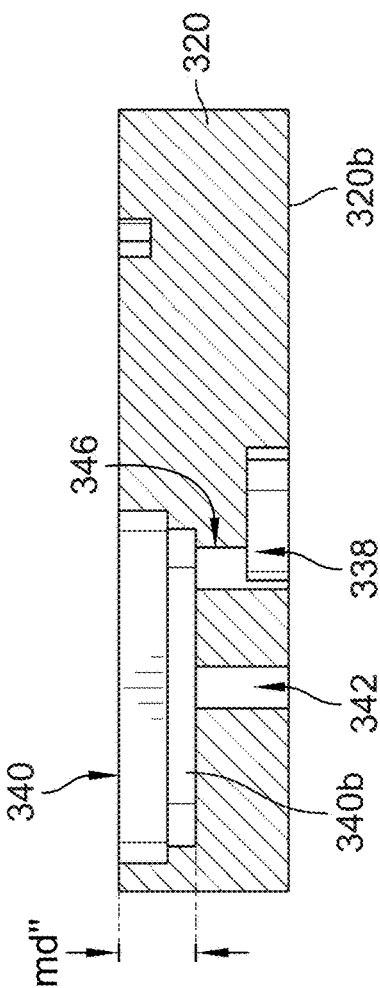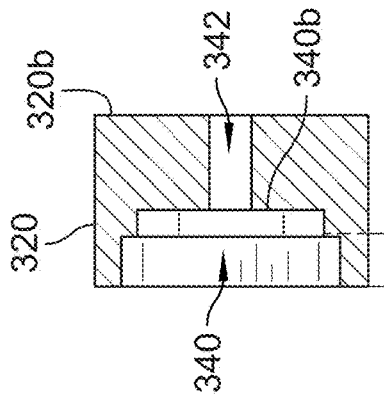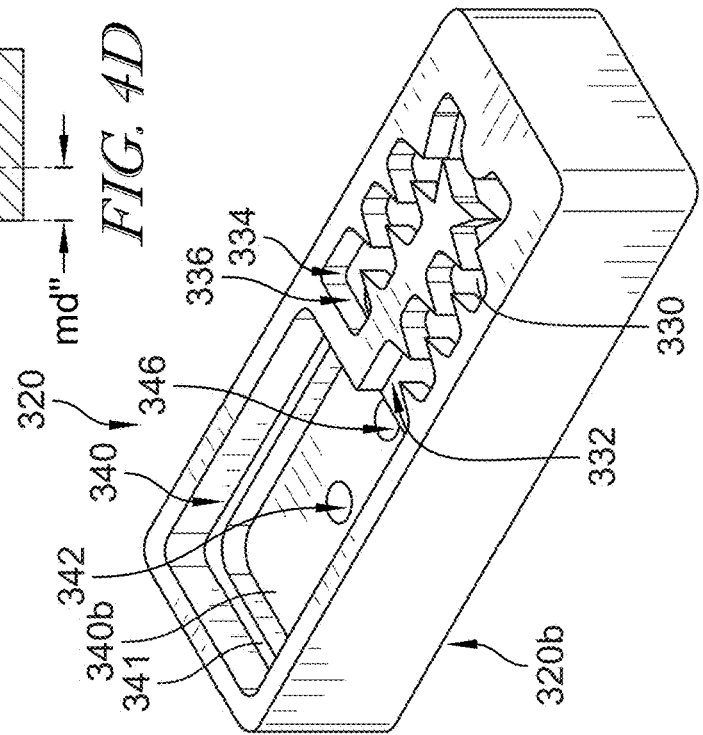

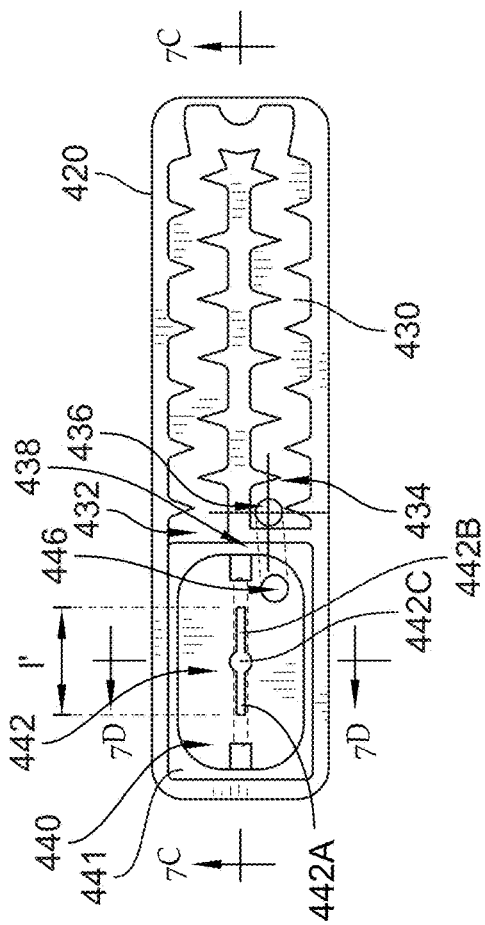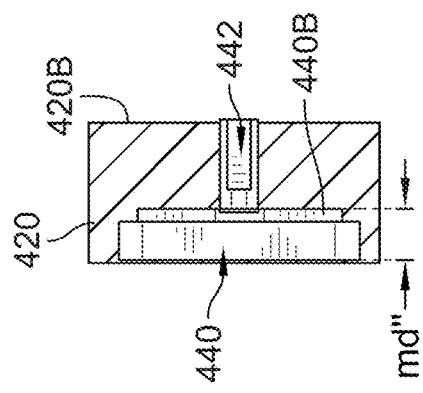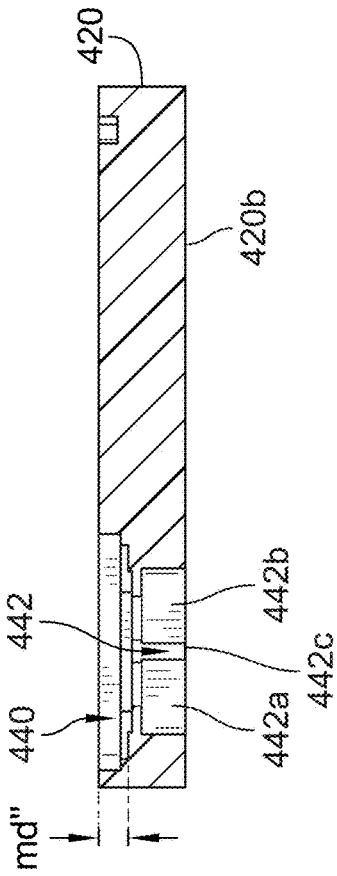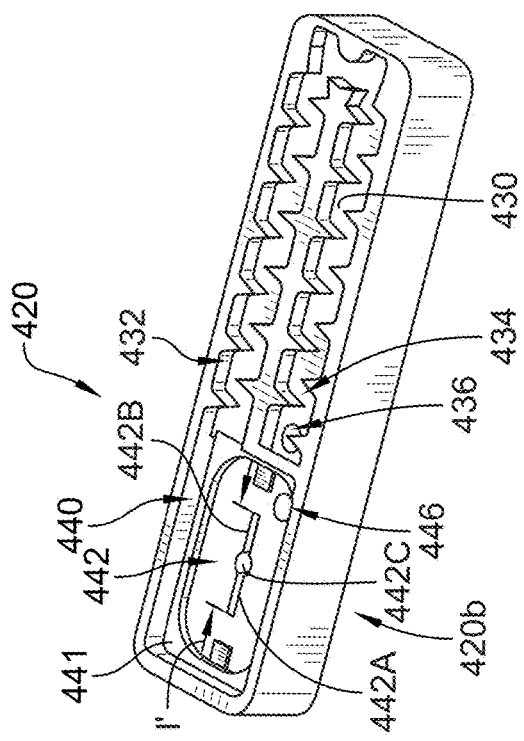

CHANNEL-LESS DRIP IRRIGATION EMITTERS AND METHODS OF USING THE SAME

CROSS REFERENCE TO RELATED APPLICATIONS

This application claims priority to and the benefit of U.S. Provisional Patent Application No. 63/065,481, entitled "Channel-less Drip Irrigation Emitters and Methods of Using the Same," filed Aug. 13, 2020, the content of which is incorporated by reference herein in its entirety.

GOVERNMENT RIGHTS

This invention was made with Government support under Grant No. AID-OAA-A-16-00058 awarded by the U.S. Agency for International Development. The Government has certain rights in the invention.

FIELD

The present disclosure relates to drip irrigation emitters, and more particularly relates to designs of drip irrigation emitters that do not include a channel formed in the membrane cavity, such as in a land.

BACKGROUND

Drip irrigation systems and methods are used to deliver water and/or nutrients directly to the root zone of a plant. The water and/or nutrients are pumped into a system to flow along a delivery path (e.g., a network of water lines or pipes) that is set-up in the ground of a field of crops. The path includes outlets proximate to the root zone of the plants such that the water and/or nutrients flow through the delivery path and exit the outlets to be delivered to the root zone of the respective plants.

Such systems often include drip irrigation emitters disposed along the delivery path to aid in delivering water and/or nutrients to desired locations in a controlled, often more uniform, manner. More particularly, the drip irrigation emitters can be disposed within, referred to herein as being inline with the delivery path (i.e., bonded to the inside of the irrigation tubing), or external to the delivery path, referred to herein as being online (i.e., inserted manually into holes on the exterior of the irrigation tubing). Such emitters are typically spaced a desired distance(s) apart throughout the delivery path. Each emitter discharges or otherwise delivers the water and/or nutrients to a nearby root zone of a plant. As a result of this controlled, targeted water and/or nutrients delivery, it is possible to irrigate with substantially less water and/or nutrients as compared to conventional delivery systems including sprinklers and flooding methods. Further, drip irrigation systems also experience less water percolation, surface run off, or evaporation, all resulting in saving water. Other advantages include fewer weeds, as water is applied only to regions where it is required, and the use of less fertilizer due to targeted watering and better soil moisture levels providing for higher crop yields. Larger scale, global advantages include helping to address water scarcity issues and insufficient crop yields.

Pressure-compensating (PC) drip emitters have been developed that emit a constant flow rate of water despite fluctuations in input water pressure. The PC drip emitters regulate the emitter flow rate along a length of the delivery path, thus enabling longer lateral pipes and the like to be used so that a larger area can be irrigated with drip irrigation systems.

Despite the numerous benefits of drip irrigation systems and methods, including increased crop production with lower on-farm water consumption than other irrigation methods, its typically high costs keep such systems and methods out of reach for many smallholder farmers. The high costs result, for example, from needing high pumping pressures to operate sustainably, causing high capital and operating costs for the pump and associated power system. Another problem existing emitters face is a tendency to clog. The clogs can occur, for example, due to suspended or dissolved solids being in the water that flows into the emitters and getting in the emitter. One or the most common locations where such solids get stuck is a channel formed in a membrane cavity of the emitter.

FIG. 1A illustrates one example of a known PC drip emitter 10 disposed inline of a delivery path, as shown bonded to the inside of irrigation tubing 100. The PC drip emitter 10, illustrated in more detail in FIGS. 1B and 1C, includes a body 20 having a flow path 30 formed therein and membrane cavity 40, a membrane 50 disposed within the membrane cavity 40, and a cover 60 that is coupled to the body 20, for example by ultrasonically welding the two components together. The cover 60 includes an inlet 62 through which a fluid, such as water, can enter the emitter 10. More particularly, as shown in FIG. 1D, water can pass from the inlet 62, as shown by FIG. 1B above the membrane 50 on a side of the membrane 50 opposite of the membrane cavity 40, and through the flow path 30 from a terminal entry point 32 to a terminal exit point 34, disposed at opposite ends of the flow path 30, respectively. As water passes through the flow path 30, a change in pressure occurs, the pressure dropping such that the water pressure at the terminal entry point 32 is greater than the water pressure at the terminal exit point 34. The terminal exit point 34 includes an opening 36 that is in fluid communication with an opening 46 formed in the membrane cavity 40, the opening 46 being disposed below the membrane 50, i.e., on a side of the membrane 50 opposite of the inlet 62 formed in the cover 60. This fluid communication can be provided, for example, by a fluid path 38. The water then enters the membrane cavity 40 and flows towards an outlet 42 formed in the membrane cavity 40. The outlet 42 is in fluid communication with an outside environment such that the water flows out of the outlet 42 and to a desired delivery location, such as the root zone of a plant. The term "outside environment" encompasses any environment that is outside of the emitter 10 itself, and thus an outside environment is not necessarily outside in the ground or air; the outside environment can be an inside controlled environment that is still "outside" of the emitter. While the size and shape of the emitter 10 will depend on a variety of factors, including but not limited to the intended use, the size and shape of other components with which it will be used (e.g., other emitters, tubing to which the emitter is attached, etc.), and factors associated with the environment in which the emitter will be used, emitters can often have rectangular prism shape with a length l approximately in the range of about 20 millimeters to about 60 millimeters, a width w approximately in the range of about 7 millimeters to about 15 millimeters, and a height h approximately in the range of about 3 millimeters to about 10 millimeters.

FIGS. 1E-1G illustrates a typical set-up in the membrane cavity 40 that enables the fluid entering the cavity 40 via the flow path 30 to pass through the membrane cavity 40 and through the outlet 42 to the desired delivery location. As shown, the membrane cavity 40 typically includes a land or lands 44 formed in the cavity 40, with the land 44 surrounding the outlet 42. The land 44 is embossed otherwise raised with respect to a bottom surface 40b of the membrane cavity 40. Formed in the land 44 is a channel 48 that is in fluid communication with the outlet 42. The channel 48 extends through a thickness of the land 44 but has a terminal bottom surface 48b defined by the bottom surface 40b of the membrane cavity 40. Alternatively, the channel 48 can extend into a thickness of the body 20 that defines the membrane cavity 40, with the terminal bottom surface 48b terminating prior to the terminal bottom end of the body 20. Such a configuration is possible with or without a land 44. That is, the depth of the channel 48 formed in the membrane cavity 40 to communicate with the outlet 42 terminates prior to a terminal bottom end 20b of the body 20 (FIGS. 1B and 1C, the portion not visible that forms a body of the body 20). Accordingly, while the outlet 42 communicates directly with an outside environment, the channel 48 does not because fluid flowing through the channel 48 can only enter the outside environment after passing through the outlet 42. In many configurations, the channel has a width approximately in the range of about 0.3 millimeters to about 0.7 millimeters and a height approximately in the range of about 0.05 millimeters to about 0.30 millimeters. Pressure compensation in these channeled designs can be achieved, for example, by altering a cross-sectional flow area underneath the membrane 50 and/or altering the covered area of the outlet 42.

More particularly, a flow resistance of the channel 48 is very sensitive to small changes in membrane 50 deformation, the membrane typically being flexible or compliant, thus allowing the emitter 10 to keep flow rate constant as pressure changes. This holds true as long as an inlet pressure is above a minimum activation pressure. For example, as shown in FIGS. 1F and 1G, the pressure is approximately 0 bar when the membrane 50 is stationary (FIG. 1F), as represented by opposed facing surfaces 52 and 54 of the membrane being substantially flat and substantially parallel with respect to a longitudinal axis L-L extending through an entire length of the emitter 10, but as water flows through the emitter 10 and a pressure drop occurs, the membrane 50 deflects towards the lands 44 (at least sometimes contacting the lands 44), creating a pressure within the membrane cavity 40 (FIG. 1G) and causing the membrane 50 to deflect downwards such that the opposed facing surfaces 52 and 54 have concave configurations. The displacement of the membrane 50 is due, at least in part, to the pressure of the water above the membrane 50 being higher than the pressure of water below the membrane 50. The pressure P in the membrane cavity 40 to induce fluid flow out of the outlet 42 is greater than an activation pressure Pact, which is typically about 0.4 bars or greater in most conventional inline PC drip emitters (typically approximately in the range of about 0.4 bars to about 1.0 bar, which is approximately in the range of about 40 kPA to about 100 kPA). As shown in FIG. 1G, a force $F_{lands}$ helps to drive water through the channel 48, for instance by capillary action. Water thus flows through the channel 48, between the terminal bottom surface 48b of the channel 48 and the bottom surface 54 of the membrane 50, and then out of the outlet 42 to an outside environment. As a result, a series of PC emitters can provide a more uniform water application to all crops in a field, even with uneven terrain, while also allowing for longer pipes and more freedom in a hydraulic network design. The pressure of the fluid as it exits the emitter 10 can drop to atmospheric pressure. Notably, the small dimensions of the channel 48 make it prone to clogging, for instance due to particles in the water and/or nutrients. Typical channel cross-section dimensions are approximately 0.10 millimeters by about 0.50 millimeters.

Accordingly, there is a need for drip irrigation emitters, and methods of using the same, that are less prone to clogging while still achieving desired performance levels for water flow, including low activation pressures, constant flow rates, and minimizing wasted water.

SUMMARY

The present disclosure provides for drip irrigation emitters that forego the use of a channel in the membrane cavity, and instead provide for various membrane cavity designs that maintain the performance level of existing emitters while reducing the likelihood of clogging due to the elimination of a channel. These designs include cavities that have a sinusoidal shape, a cylindrical shape, and a flat bottom shape, although other cavity designs are possible. The cavities are designed in such a manner that they can work in conjunction with a depressed membrane to initiate water flow out of the cavity to an outside environment without a channel. Because emitters that existed prior to the present disclosure often form channels in a land or lands disposed in the cavity, the land or lands being a portion raised above the bottom surface of the cavity and often having the outlet disposed therein, the present disclosures also allow for the elimination of a land from the membrane cavity. Because emitters can often become clogged and flow can be slowed by the channel, and further because the channel can be a limiting manufacturing factor due to the tight tolerances it requires, elimination of the channel is a significant design feature and performance enhancement. This is especially true where the performance of the emitter is not compromised with respect to an activation pressure and a flow rate.

One exemplary embodiment of a drip irrigation emitter includes an inlet, a body, a membrane cavity, an outlet, a membrane, and a flow path. The membrane cavity is formed in the body and has an opening formed in it, the outlet is in fluid communication with the membrane cavity, and the membrane is disposed above a bottom surface of the membrane cavity. The flow path has an entry point that is in fluid communication with the inlet and an exit point that is in fluid communication with the opening formed in the membrane cavity. Further, the flow path is configured to decrease a pressure of fluid flowing through the path at the fluid passes from the entry point to the exit point. The membrane cavity is devoid of a channel through which fluid passes as it moves from the membrane cavity, through the outlet, and to an outside environment.

The bottom surface of the membrane cavity can have many different shapes or configurations. By way of non-limiting example, the bottom surface of the membrane cavity can include a sinusoidal shape. The shape can have each of the opening and the outlet associated with it. A maximum depth of such a sinusoidal shape can be, for example, approximately in the range of about 0.5 millimeters to about 3.0 millimeters. In some embodiments the maximum depth can be approximately 1.5 millimeters. The opening and the outlet can be disposed in a variety of locations. For example, the opening and the outlet can be disposed on opposed sides of an approximate center of the bottom surface of the membrane.

By way of another non-limiting example, the bottom surface of the membrane cavity can include a cylindrical shape. The shape can have each of the opening and the outlet associated with it. A maximum depth of such a cylindrical shape can be, for example, approximately in the range of about 0.5 millimeters to about 3.0 millimeters. In some embodiments the maximum depth can be approximately 0.9 millimeters. The opening and the outlet can be disposed in a variety of locations. For example, the opening and the outlet can be disposed kitty-corner with respect to each other, off-center from an approximate center of the bottom surface of the membrane cavity.

By way of still another non-limiting example, the bottom surface of the membrane cavity can be substantially flat across its surface area. The substantially flat bottom surface can include each of the opening and the outlet associated with it. A maximum depth of the membrane cavity can be approximately in the range of about 0.5 millimeters to about 3.0 millimeters. In some embodiments the maximum depth can be approximately 1.0 millimeters. The opening and the outlet can be disposed in a variety of locations. For example, the opening can be offset from an approximate center of the bottom surface of the membrane and the outlet can be disposed at the approximate center of the bottom surface of the membrane cavity. Alternatively, each of the opening and the outlet can be offset from an approximate center of the bottom surface of the membrane cavity.

In some embodiments the outlet can include an elongate slot. The elongate slot can include, for example, wings extending from opposed sides of a center of the outlet. A cover can be included as part of the drip irrigation emitter. The cover can be coupled to the body. The inlet can be disposed in the cover. The bottom surface of the membrane cavity can be devoid of a land.

An activation pressure of the emitter can be approximately in the range of about 0.1 bar to about 0.3 bar. For example, the activation pressure can be is approximately 0.15 bar. A flow rate of the emitter once activated can be approximately in the range of about 0.1 liters per hour to about 8.0 liters per hour. For example, the flow rate of the emitter once activated can be approximately in the range of about 2.5 liters per hour to about 3.0 liters per hour.

One exemplary method of dispensing fluid at a substantially constant flow rate includes passing fluid through a flow path of a drip irrigation emitter, thereby decreasing a pressure of the fluid, passing the fluid from the flow path into a membrane activity, and applying a force to the fluid in the membrane cavity to pass the fluid out of an outlet in fluid communication with the membrane cavity without the fluid passing through a channel disposed in the membrane cavity.

The bottom surface of the membrane cavity can have many different shapes or configurations. By way of non-limiting examples, a bottom surface of the membrane cavity can include: a sinusoidal shape, a cylindrical shape, or it can be substantially flat across its surface area. In each of these instances, as well as other instances, the shape can have each of an opening in fluid communication with the flow path and the outlet associated with it.

In some embodiments the outlet can include an elongate slot. The elongate slot can include, for example, wings extending from opposed sides of a center of the outlet. The bottom surface of the membrane cavity can be devoid of a land.

In some embodiments a substantially constant flow rate can be achieved with an activation pressure approximately in the range of about 0.1 bar to about 0.3 bar. For example, the activation pressure can be is approximately 0.15 bar. In some embodiments a substantially constant flow rate through the outlet once activated can be approximately in the range of about 0.1 liters per hour to about 8.0 liters per hour. For example, the flow rate through the outlet once activated can be approximately in the range of about 2.5 liters per hour to about 3.0 liters per hour.

BRIEF DESCRIPTION OF DRAWINGS

This disclosure will be more fully understood from the following detailed description taken in conjunction with the accompanying drawings, in which:

FIG. 3A is a perspective view of another exemplary embodiment of a body of a PC drip emitter, the body including a membrane cavity having a cylindrical configuration;

FIG. 3B is a top view of the body of the PC drip emitter, including the membrane cavity, of FIG. 3A;

FIG. 3C is a cross-sectional front view of the membrane cavity of FIG. 3B taken along line A-A;

FIG. 3D is a cross-sectional side view of the membrane cavity of FIG. 3B taken along line B-B;

FIG. 4A is a perspective view of still another exemplary embodiment of a body of a PC drip emitter, the body including a membrane cavity having a flat configuration;

FIG. 4B is a top view of the body of the PC drip emitter, including the membrane cavity, of FIG. 4A;

FIG. 4C is a cross-sectional front view of the membrane cavity of FIG. 4B taken along line C-C;

FIG. 4D is a cross-sectional side view of the membrane cavity of FIG. 4B taken along line D-D;

FIG. 7A is a perspective view of another exemplary embodiment of a body of a PC drip emitter, the body including a membrane cavity having a flat configuration with a long outlet formed therein;

FIG. 7B is a top view of the body of the PC drip emitter, including the membrane cavity, of FIG. 7A;

FIG. 7C is a cross-sectional front view of the membrane cavity of FIG. 7B taken along line C-C;

FIG. 7D is a cross-sectional side view of the membrane cavity of FIG. 7B taken along line D-D;

GENERAL DESCRIPTION

Figure 1A:
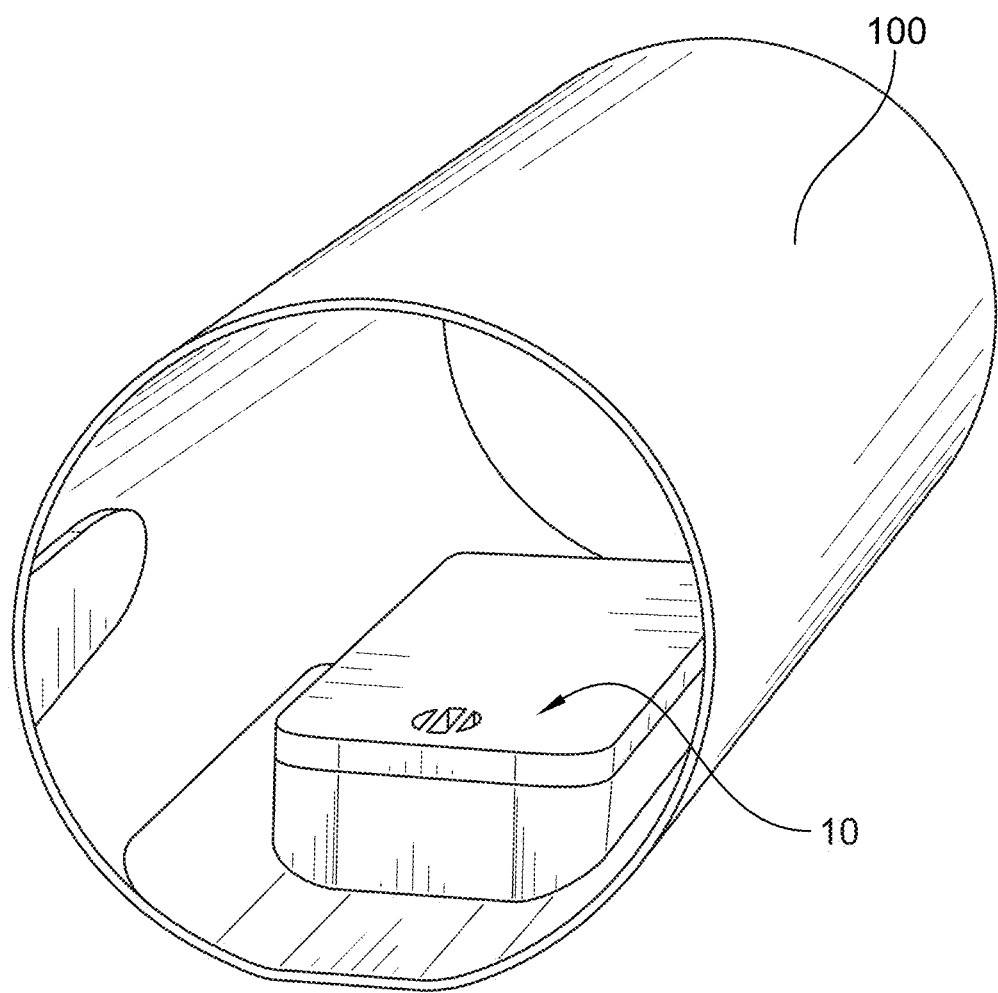
FIG. 1A is a perspective view of a known PC drip emitter bonded to an inner surface of a portion of an irrigation tube.
Figure 1B:
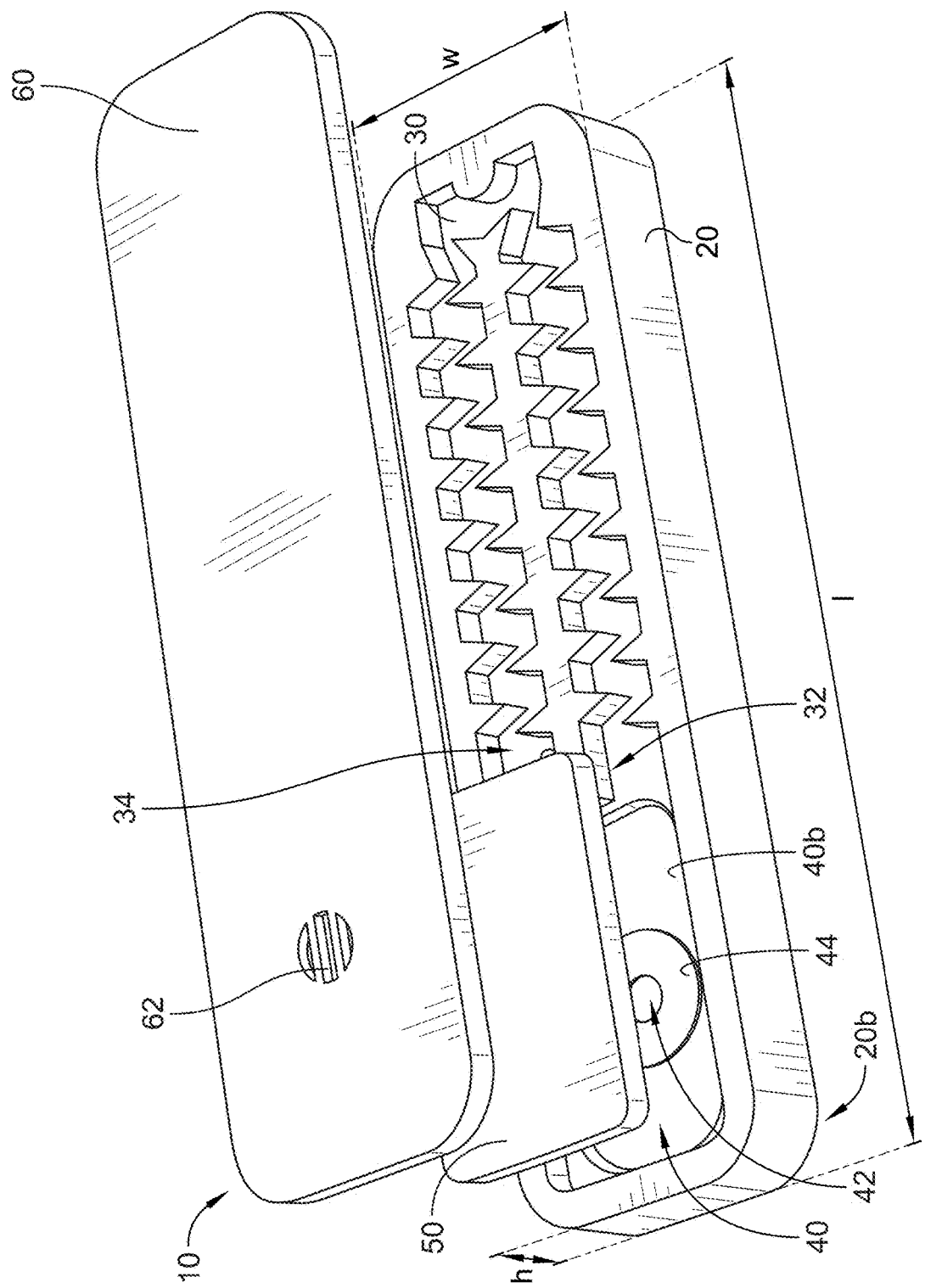
FIG. 1B is an exploded view of the known PC drip emitter of FIG. 1A, the drip emitter including a cover, a membrane, and a body.
Figure 1C:
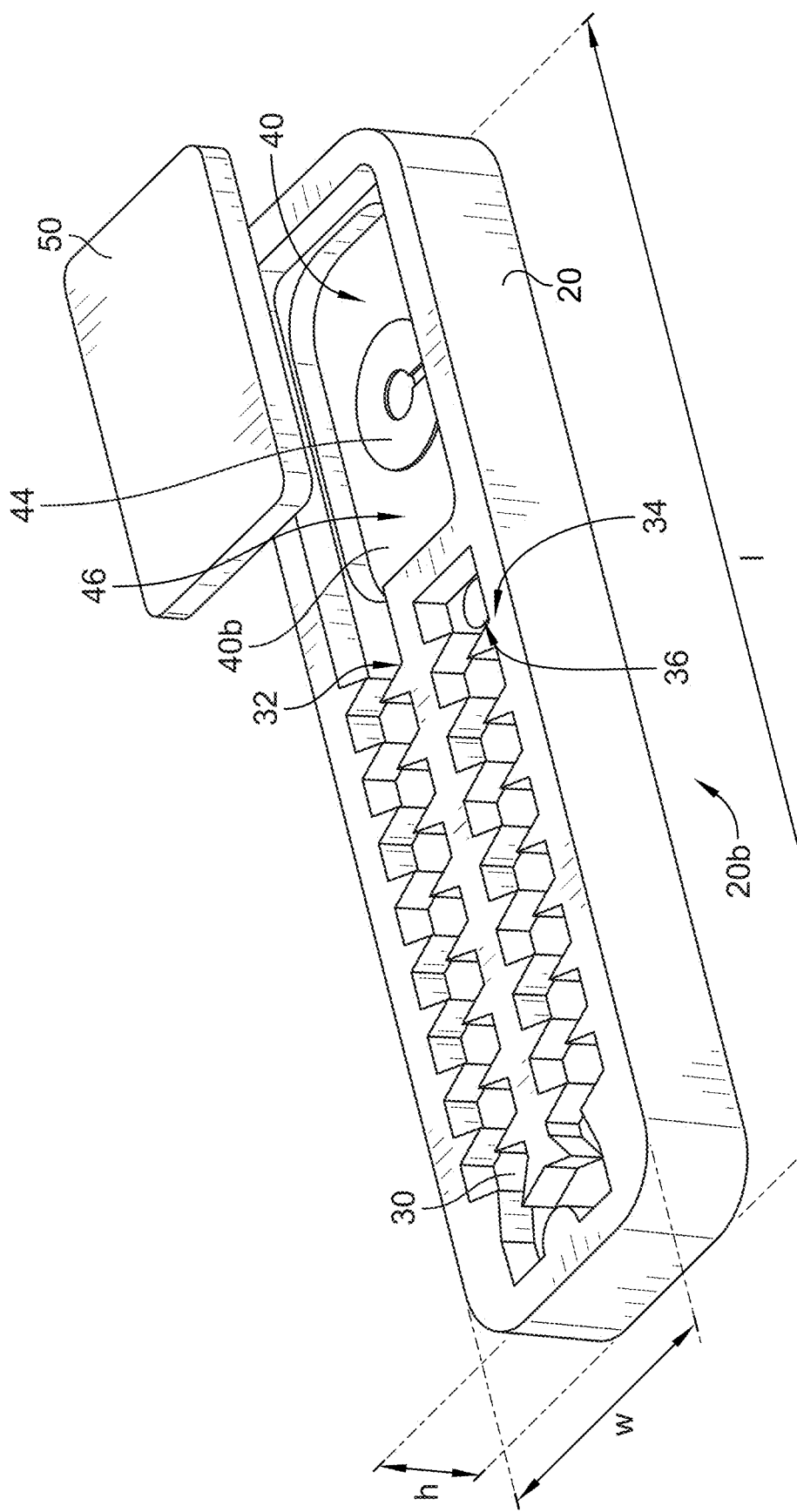
FIG. 1C is a perspective view of the PC drip emitter of FIG. 1B, including the body and the membrane.
Figure 1D:
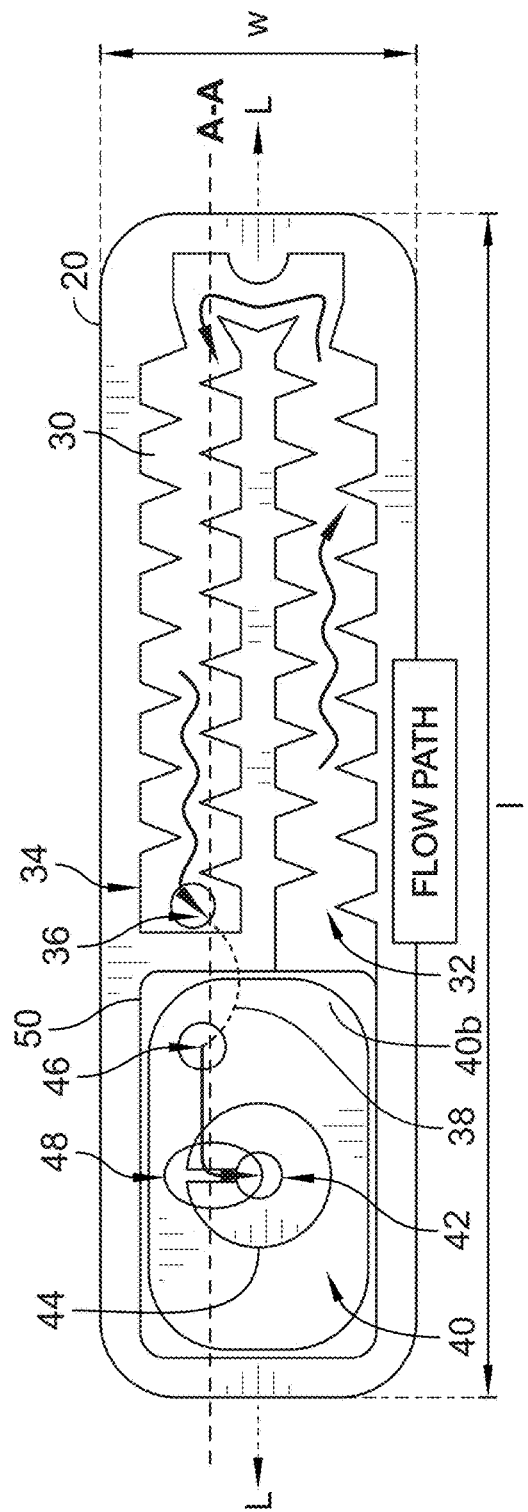
FIG. 1D is a top view of the body of the PC drip emitter of FIG. 1C.
Figure 1E:
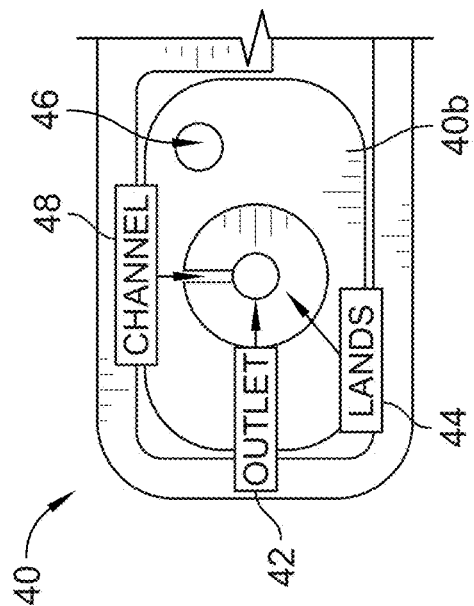
FIG. 1E is a top view of a membrane cavity of the body of FIG. 1D.
Figure 1F:
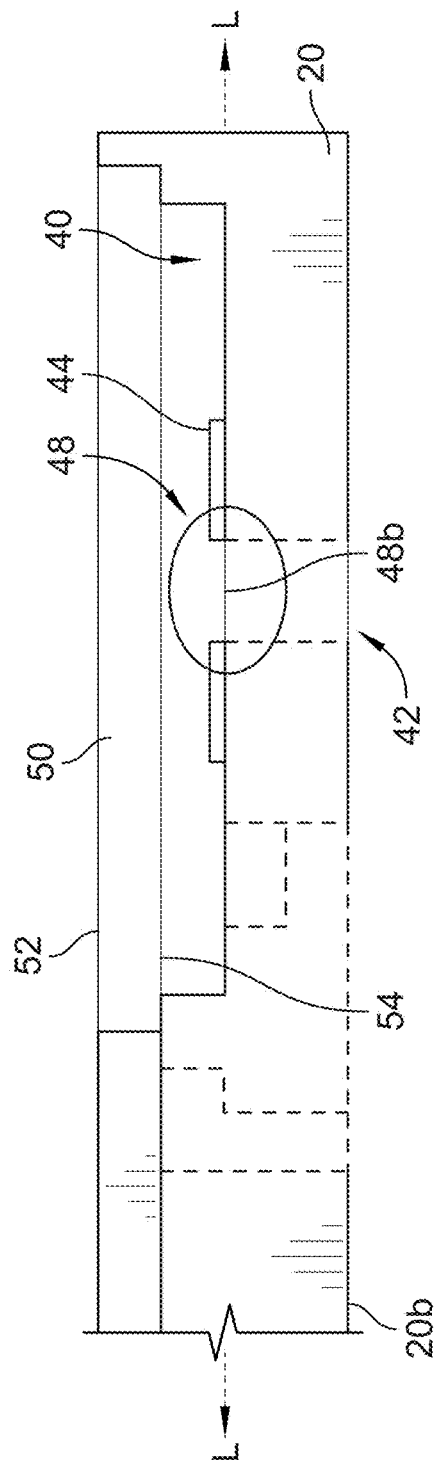
FIG. 1F is a cross-sectional back view of the membrane cavity of FIG. 1D taken along line A-A, the membrane of the drip emitter being in an inactivated state.
Figure 1G:
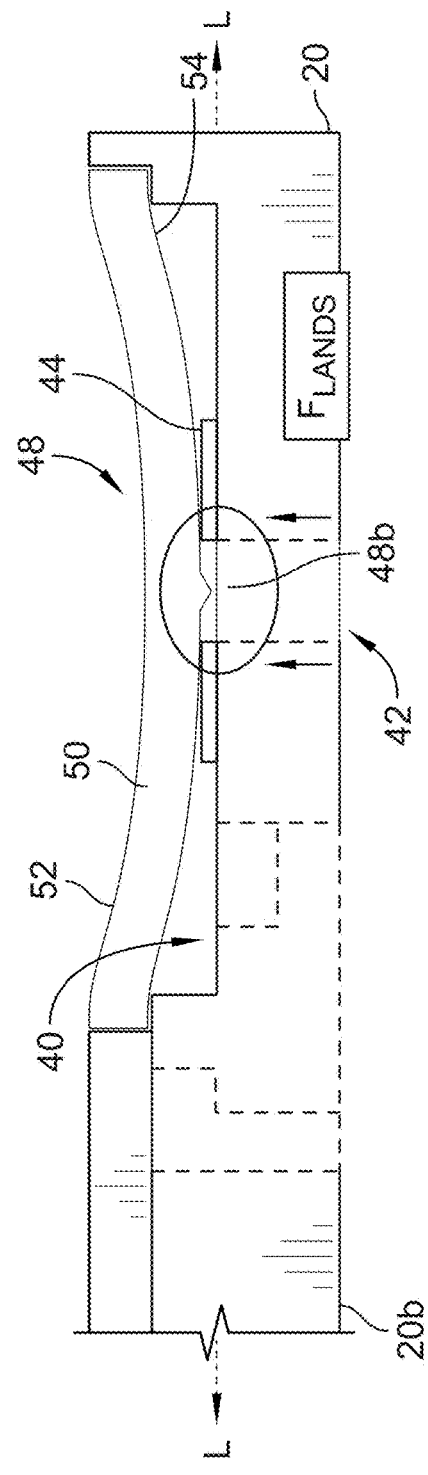
FIG. 1G is the cross-sectional back view of the membrane cavity of FIG. 1F, the membrane of the drip emitter being in an activated state.
Figure 2B:
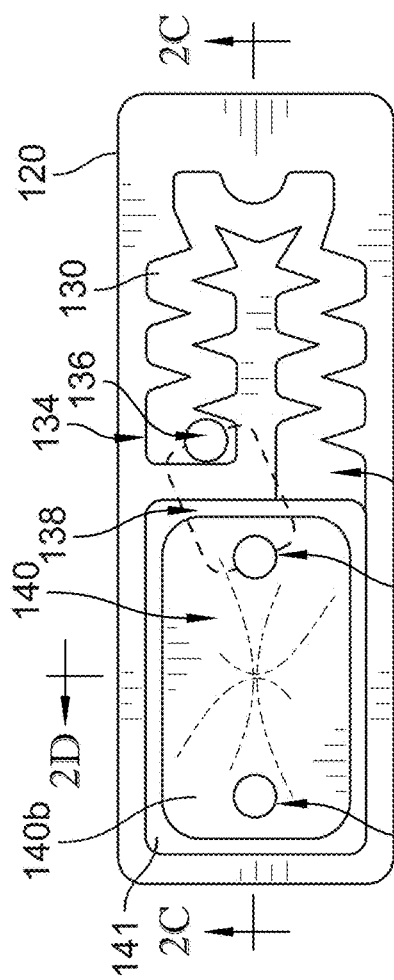
FIG. 2B is a top view of the body of the PC drip emitter, including the membrane cavity, of FIG. 2A.
Figure 2C:
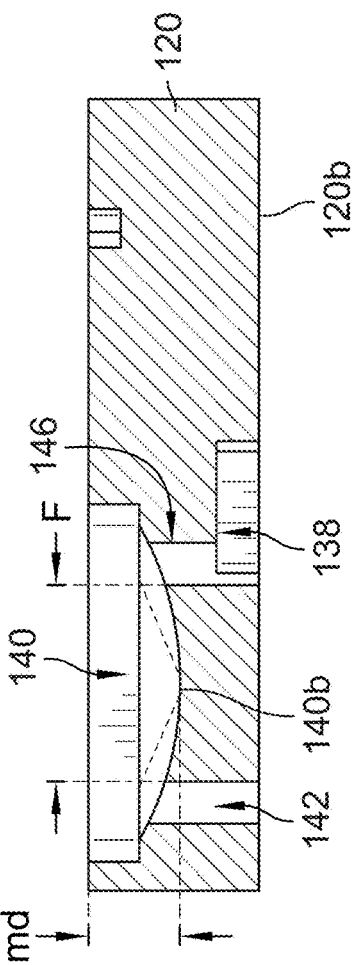
FIG. 2C is a cross-sectional front view of the membrane cavity of FIG. 2B taken along line A-A.
Figure 2D:
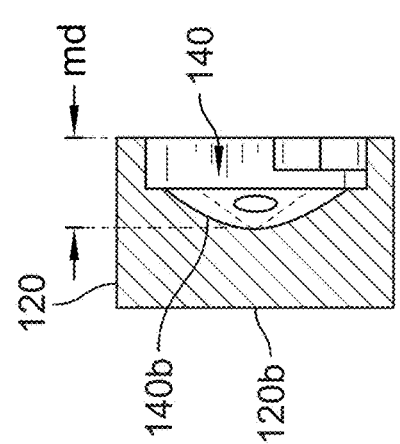
FIG. 2D is a cross-sectional side view of the membrane cavity of FIG. 2B taken along line B-B.
Figure 2A:
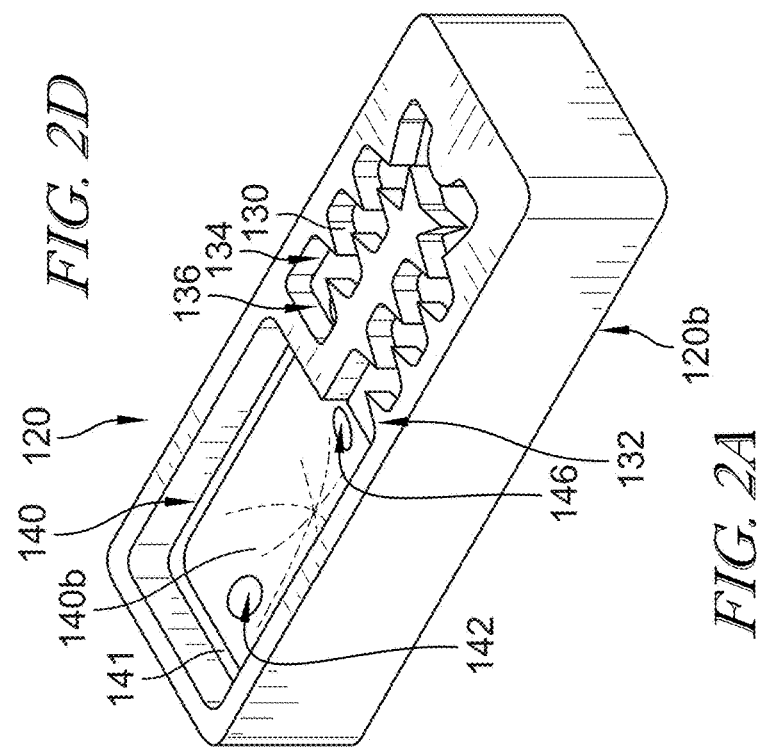
FIG. 2A is a perspective view of one exemplary embodiment of a body of a PC drip emitter, the body including a membrane cavity having a sinusoidal configuration.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. In the present disclosure, like-numbered components of various embodiments generally have similar features and functionality when those components are of a similar nature and/or serve a similar purpose. To the extent features, sides, components, steps, or the like are described as being "first," "second," "third," etc., such numerical ordering is generally arbitrary, and thus such numbering can be interchangeable. Likewise, to the extent features are described as being disposed on top of, below, next to, etc. such descriptions are typically provided for convenience of description, and a person skilled in the art will recognize that, unless stated or understood otherwise, other locations and positions are possible without departing from the spirit of the present disclosure.

The present disclosure provides for drip irrigation emitters that are designed to be less prone to clogging. More specifically, a membrane cavity portion of the disclosed drip irrigation emitters has been designed in a manner that helps prevent clogging while still achieving desired performance levels, such as water flow, low activation pressures, and constant flow rates that approximately match or exceed the performance level for drip irrigation emitters. Each of the membrane cavities in the disclosed embodiments can be described as "channel-less," meaning they do not include a typical feature of emitters—a channel to pass fluid from the cavity, through an outlet, and into an outside environment. In existing emitters, a channel is often formed in a land or lands, which is often a feature that is raised with respect to a bottom surface of the membrane cavity, with the outlet being formed in the land or otherwise in fluid communication with an opening formed in the land. Accordingly, embodiments of the present disclosure also do not typically include a land, although a land could be provided for if desired. The emitters of the present disclosure help to minimize wasted water. While the drip irrigation emitters of the present disclosure are often used inline with respect to a water distribution path, the present disclosures can also be applied to online emitters.

The operation of the disclosed drip irrigation emitters up until water and/or nutrients enter and flow through a membrane cavity are similar to the emitter 10 of FIGS. 1A-1G, and thus a description of the same, and/or an illustration of some components of the same (e.g., a cover, an inlet, and/or a membrane) is unnecessary. Accordingly, the focus of the illustrated embodiments is on bodies of drip irrigation emitters, and more specifically geometries associated with a membrane cavity. Further, while the present disclosure often describes the fluid flowing through the emitter as water, a person skilled in the art will recognize that other fluids can be used in lieu, or in conjunction with, water, and that nutrients can be included as a liquid or dispersed within fluid being passed through the emitter as part of a suspension.

FIGS. 2A-2D illustrate one exemplary embodiment of a body 120 of a drip irrigation emitter. The body 120 includes a flow path 130 formed therein, the flow path 130 being in fluid communication with a membrane cavity 140 via a fluid path 138 extending between an opening 136 formed at a terminal exit point 134 of the flow path 130 and an opening 146 formed in the membrane cavity 140. The flow path 130 can include a terminal entry point 132 that is in fluid communication with an inlet, such as an inlet formed in a cover of the emitter (not shown, but akin to the inlet 62 and cover 60 of the emitter 10). Notably, while the present disclosure describes the flow path 130, and other flow paths, as having terminal entry and exit points, a person skilled in the art will recognize that such entry and exit points do not necessarily have to be terminal ends of the respective flow path. Further, an inlet can be formed in other portions of an emitter, and not necessarily just in a cover. These statements hold true for each of the embodiments provided for herein, as to at least other statements related to particular features where the features are commonly numbered.

The membrane cavity 140 includes an outlet 142 that is in fluid communication with an outside environment. As shown, the outlet 142 is off-center from an approximate center of a bottom surface 140b of the cavity 140, substantially equidistant from the approximate center as the opening 146, which is disposed on the opposed side from the outlet 142. In the present disclosures, the outlet 142 and the opening 146 are illustrated as being formed in the bottom surface 140b of the cavity, but the outlet 142 and the opening 146 can be considered to be associated with membrane cavity 140 more generally, meaning that they are in fluid communication with the membrane cavity 140 even if in some embodiments they are not formed directly in the bottom surface 140b. Unlike the cavity 40 of the emitter 10, the membrane cavity 140 does not include a land (e.g., land 44) or a channel (e.g., channel 48). Instead, the bottom surface 140b of the membrane cavity 140 has sinusoidal shape. As shown, the sinusoidal shape extends between the opening 146 and the outlet 142, with a maximum depth md of the cavity 140 being formed approximately in a center of the cavity 140, although other configurations are possible. The outlet 142 is not a channel because it extends through a terminal bottom end 120b of the body 120, and thus it does not have a bottom defined by the bottom surface 140b of the cavity 140. In the illustrated embodiment, a ledge 141 is formed as part of the cavity 140. A membrane (not shown, but akin to the membrane 50) can sit or otherwise be coupled to the ledge 141.

As water flows into the cavity 140, and a membrane (not shown) depresses towards the bottom surface 140b, an activation pressure is generated within the cavity 140 that pumps the water through the sinusoidal shape in the cavity 140 and through the outlet 142 to an outside environment (e.g., a root zone near a plant). While the size and shape of the membrane cavity 140 will depend on a variety of factors, including but not limited to the intended use, the size and shape of other components of the emitter (e.g., the flow path, the membrane, etc.) and/or components with which it will be used (e.g., other emitters, tubing to which the emitter is attached, etc.), and factors associated with the environment in which the emitter will be used, in some embodiments, the maximum depth md can be approximately in the range of about 0.5 millimeters to about 8.0 millimeters, or approximately in the range of about 2.0 millimeters to about 3.25 millimeters, and in some embodiments, it can be approximately 3.25 millimeters. Alternatively, or additionally, a maximum depth, sometimes referred to herein as a second maximum depth, can be measured from a top surface of the ledge 141 to a bottom portion of the cavity, akin to the bottom portion illustrated for the maximum depth md. The maximum depth for that measurement can be approximately in the range of about 0.10 millimeters to about 5.0 millimeters, or approximately in the range of about 0.25 millimeters to about 1.5 millimeters, and in some embodiments, it can be about 1.5 millimeters. The two described maximum depths can extend outside of those ranges as well, and can be impacted by factors such as a thickness of a membrane disposed within and/or above the cavity 140. Aspects such as the sizes and locations of the outlet 142, the opening 146, the maximum depth md, and the second maximum depth can be altered without departing from the spirit of the present disclosure.

In one prototype of a drip emitter having a bottom surface 140b with a sinusoidal shape that has been designed and tested, the maximum depth md was about 1.5 millimeters, a distance F between the outlet 142 and the opening 146 approximately 8.7 millimeters, and a thickness of the membrane was about 1.2 millimeters. In a second prototype, the maximum depth md and the distance F were the same, but a thickness of the membrane was about 1.4 millimeters. Both prototypes showed results aligned with the benefits described herein. A person skilled in the art, in view of the present disclosures, will understand that parameters such as the maximum depth md, the distance F, and the membrane thickness can be modified to help optimize the performance based on the teachings herein. The ranges of those values can depend on a variety of factors, including but not limited to the intended use of the emitter, the size and shape of various components of the emitter and/or of other components with which the emitter will be used (e.g., other emitters, tubing to which the emitter is attached, etc.), and factors associated with the environment in which the emitter will be used. Some non-limiting ranges for those values include the ranges described above for maximum depth md, the distance F approximately in the range of about 2 millimeters to about 15 millimeters, and the membrane thickness approximately in the range of about 0.5 millimeters to about 2.5 millimeters.

FIGS. 3A-3D illustrate another exemplary embodiment of a body 220 of a drip irrigation emitter. The body 220 includes a flow path 230 formed therein, the flow path 230 being in fluid communication with a membrane cavity 240 via a fluid path 238 extending between an opening 236 formed at a terminal exit point 234 of the flow path 230 and an opening 246 formed in the membrane cavity 240. The flow path 230 can include a terminal entry point 232 that is in fluid communication with an inlet, such as an inlet formed in a cover of the emitter (not shown, but akin to the inlet 62 and cover 60 of the emitter 10).

The membrane cavity 240 includes an outlet 242 that is in fluid communication with an outside environment. As shown, the outlet 242 is off-center from an approximate center of a bottom surface 240b of the cavity 240, substantially equidistant from the approximate center as the opening 246, the outlet 242 and opening 246 being disposed near or at opposed approximate corners of the cavity 240 (i.e., kitty-corner with respect to each other). Unlike the cavity 40 of the emitter 10, the membrane cavity 240 does not include a land (e.g., land 44) or a channel (e.g., channel 48). Instead, the bottom surface 240b of the membrane cavity 240 has a cylindrical shape. Alternatively, other shapes are possible, including but not limited to elliptic cylindrical. Likewise, other shapes for the outlet 242 are possible beyond the circular outlet illustrated. In fact, alternative shaped outlets are possible in any of the various configurations, as are alternatively shaped openings, like the openings 236 and 246, and other features of the variously disclosed emitters and bodies. As shown a perimeter of the cylindrical shape intersects with approximate centers of the opening 246 and the outlet 242 with a maximum depth md' of the cavity 240 being formed approximately in a center of the cavity 240, although other configurations are possible. The outlet 242 is not a channel because it extends through a terminal bottom end 220b of the body 220, and thus it does not have a bottom defined by the bottom surface 240b of the cavity 240. In the illustrated embodiment, a ledge 241 is formed outside of the perimeter of the portion of the cavity 240 having depth (i.e., the portion that includes the maximum depth md' and extends below the ledge 241) such that portions of each of the opening 246 and the outlet 242 intersect with each of the ledge 241 and the portion of the cavity 240 having depth. A membrane (not shown, but akin to the membrane 50) can sit or otherwise be coupled to the ledge 241.

As water flows into the cavity 240, and a membrane (not shown) depresses towards the bottom surface 240b, an activation pressure is generated within the cavity 240 that pumps the water through the cylindrical shape in the cavity 240 and through the outlet 242 to an outside environment (e.g., a root zone near a plant). While the size and shape of the membrane cavity 240 will depend on a variety of factors, including but not limited to the intended use, the size and shape of other components of the emitter (e.g., the flow path, the membrane, etc.) and/or components with which it will be used (e.g., other emitters, tubing to which the emitter is attached, etc.), and factors associated with the environment in which the emitter will be used, in some embodiments, the maximum depth md' can be approximately in the range of about 0.5 millimeters to about 8.0 millimeters, or approximately in the range of about 2.0 millimeters to about 3.25 millimeters, and in some embodiments, it can be approximately 3.25 millimeters. Alternatively, or additionally, a maximum depth, sometimes referred to herein as a second maximum depth, can be measured from a top surface of the ledge 241 to a bottom portion of the cavity, akin to the bottom portion illustrated for the maximum depth md'. The maximum depth for that measurement can be approximately in the range of about 0.10 millimeters to about 5.0 millimeters, or approximately in the range of about 0.25 millimeters to about 1.5 millimeters, and in some embodiments, it can be about 0.9 millimeters. Aspects such as the sizes and locations of the outlet 242, the opening 246, the maximum depth md', and the second maximum depth can be altered without departing from the spirit of the present disclosure.

FIGS. 4A-4D illustrate yet another exemplary embodiment of a body 320 of a drip irrigation emitter. The body 320 includes a flow path 330 formed therein, the flow path 330 being in fluid communication with a membrane cavity 340 via a fluid path 338 extending between an opening 336 formed at a terminal exit point 334 of the flow path 330 and an opening 346 formed in the membrane cavity 340. The flow path 330 can include a terminal entry point 332 that is in fluid communication with an inlet, such as an inlet formed in a cover of the emitter (not shown, but akin to the inlet 62 and cover 60 of the emitter 10).

The membrane cavity 340 includes an outlet 342 that is in fluid communication with an outside environment. As shown, the outlet 342 is disposed in an approximate center of a bottom surface 340b of the cavity 340. Unlike the cavity 40 of the emitter 10, the membrane cavity 340 does not include a land (e.g., land 44) or a channel (e.g., channel 48). Instead, the bottom surface 340b of the membrane cavity 340 has a rectangular prism shape with a substantially flat bottom. The bottom surface 340b is substantially flat in that it does not include a raised portion, such as a land, across the surface area encompassed by a ledge 341. The outlet 342 is not a channel because it extends through a terminal bottom end 320b of the body 320, and thus it does not have a bottom defined by the bottom surface 340b of the cavity 340. As shown, the opening 346 and the outlet 342 are both disposed within the flat bottom with a maximum depth md" of the cavity 340 being substantially uniform across the flat bottom surface. In the illustrated embodiment, the ledge 341 is formed outside of the perimeter of the portion of the cavity 340 having depth (i.e., the portion that includes the maximum depth md" and extends below the ledge 341). A membrane (not shown, but akin to the membrane 50) can sit or otherwise be coupled to the ledge 341.

As water flows into the cavity 340, and a membrane (not shown) depresses towards the bottom surface 340b, an activation pressure is generated within the cavity 340 that pumps the water through the rectangular prism shape and substantially flat bottom of the cavity 340 and through the outlet 342 to an outside environment (e.g., a root zone near a plant). While the size and shape of the membrane cavity 340 will depend on a variety of factors, including but not limited to the intended use, the size and shape of other components of the emitter (e.g., the flow path, the membrane, etc.) and/or components with which it will be used (e.g., other emitters, tubing to which the emitter is attached, etc.), and factors associated with the environment in which the emitter will be used, in some embodiments, the maximum depth md" can be approximately in the range of about 0.5 millimeters to about 8.0 millimeters, or approximately in the range of about 2.0 millimeters to about 3.25 millimeters, and in some embodiments, it can be approximately 2.75 millimeters. Alternatively, or additionally, a maximum depth, sometimes referred to herein as a second maximum depth, can be measured from a top surface of the ledge 341 to a bottom portion of the cavity, akin to the bottom portion illustrated for the maximum depth md". The maximum depth for that measurement can be approximately in the range of about 0.10 millimeters to about 5.0 millimeters, or approximately in the range of about 1.0 millimeter to about 3.0 millimeters, and in some embodiments, it can be about 1.0 millimeter. Aspects such as the sizes and locations of the outlet 342, the opening 346, the maximum depth md", and the second maximum depth can be altered without departing from the spirit of the present disclosure. One non-limiting example of such an alternative configuration is discussed below with respect to FIGS. 6A and 6B.

Figure 5:
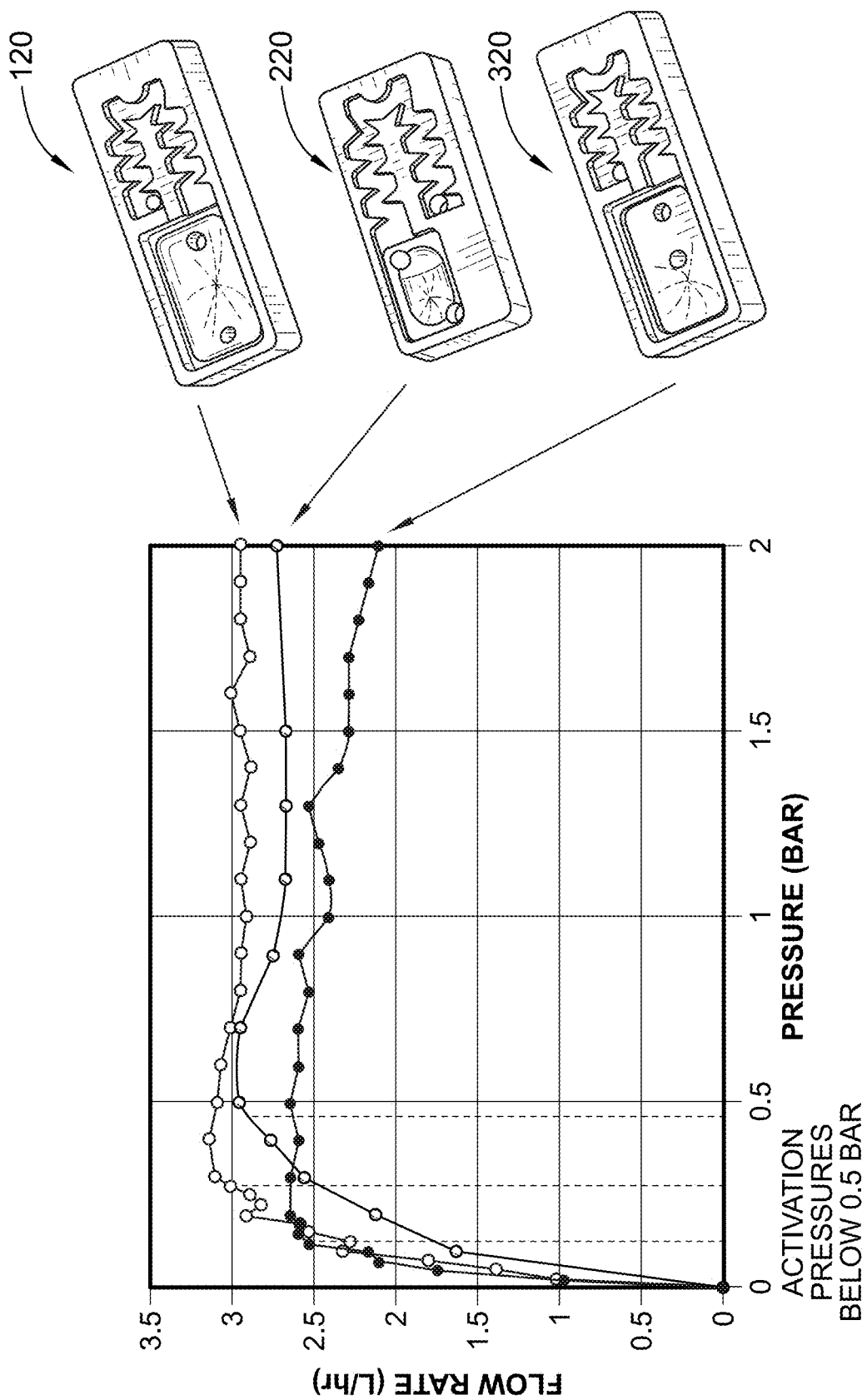
FIG. 5 is a graph that plots an activation pressure against a flow rate for the bodies of the PC drip emitters of FIGS. 2A-2D, 3A-3D, and 4A-4D.

The performance of the bodies 120, 220, 320 for emitters can be evaluated by several parameters, including but not limited to activation pressure and flow rate once activated. The graph of FIG. 5 illustrates the performance of the bodies 120, 220, and 320 with respect to these two parameters. The activation pressure is considered to be the pressure needed to obtain a substantially constant flow rate. In some embodiments, this can mean achieving a flow rate approximately in the range of about 0.1 liters per hour to about 8.0 liters per hour, or more particularly, approximately in the range of about 2.0 liters per hour to about 3.5 liters per hour, although the flow rate can depend on a variety of factors, including but not limited to intended use, the size and shape of the components used in the irrigation system, and factors associated with the environment in which irrigation is being provided. As shown, each of the three designs of the bodies 120, 220, 320 achieved a substantially constant flow rate approximately in the range of about 2.5 liters per hour to about 3.0 liters per hour with an activation pressure of approximately 0.15 bar for at least the bodies 120 and 320. More generally, the present disclosure allows for activation pressures approximately in the range of about 0.10 bar to about 0.3 bar. This is substantially better than activation pressures of existing emitters, where the activation pressure is typically closer to about 0.4 bar or about 0.5 bar. These higher activation pressures are also possible with the present disclosures but are just often not as desirable since lower activation pressures can decrease costs due to, at least in part, not needing to generate higher pressures and thus needing less powerful tooling (e.g., motors to drive the fluid through the emitter). Further, because these body 120, 220, and 320 designs are channel-less, they provide superior design aspects that decrease clogging propensity because the smallest dimensions of the flow path are bigger as compared to previous types of emitters. The bodies 120, 220, and 320 also can lead to lower manufacturing costs, at least because the architecture can be formed using two pieces instead of three—the land is eliminated—and because smaller dimensions like the channel need not be formed in the present designs. That is, while in embodiments where channels are included require very precise molds with very rigid manufacturing tolerances to insure the small size of the channel is achieved in each emitter produced, the lack of the channel provides for wider manufacturing tolerances, and thus reduces manufacturing costs. Moreover, the embodiments disclosed herein, in particular the bodies 120, 220, and 320, allow for reduced size membranes to be used with the emitters, thereby further reducing manufacturing costs. The present configurations thus reduce manufacturing complexity and the time necessary to make each emitter. These advantages thus also carry over to material costs, which can be lower due to their being fewer materials to use to manufacture the emitter.

Figure 6A:
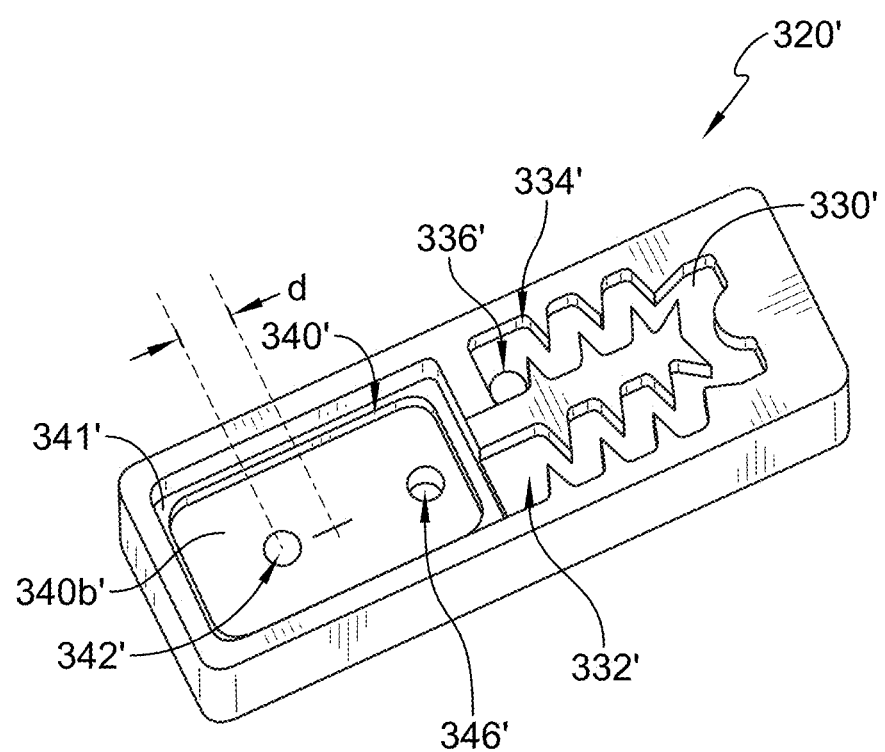
FIG. 6A is a perspective top view of another exemplary embodiment of a body of a PC drip emitter, the body including a membrane cavity having a flat configuration.
Figure 6B:
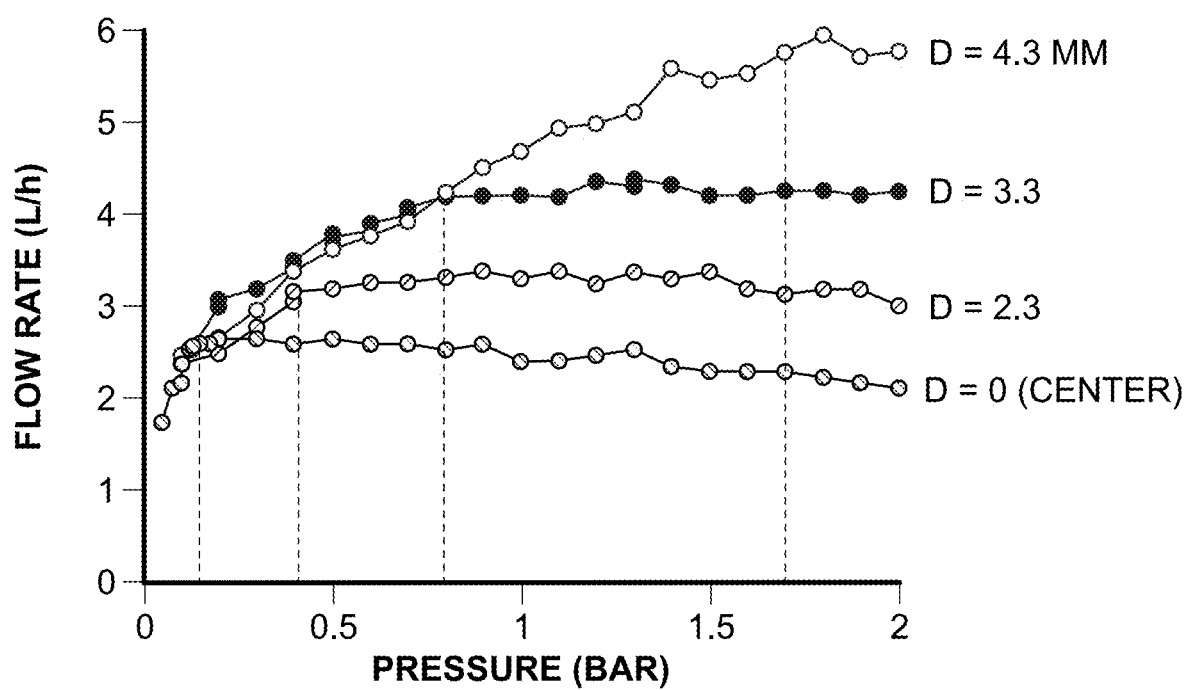
FIG. 6B is a graph that plots an activation pressure against a flow rate for the body of FIG. 6A, illustrating how these parameters change as a distance of an outlet formed in the body moves away from center.

A non-limiting, second embodiment of a body 320' of a drip irrigation emitter having a membrane cavity 340' with a bottom surface 340b' that has a substantially flat bottom is illustrated in FIG. 6A. The configuration is similar to that of the body 320 of FIGS. 4A-4D, including, for example, a flow path 330', a terminal entry point 332' of the flow path 330', an opening 336' formed at a terminal exit point 334' of the flow path 330', the rectangular prism shape and ledge 341' of the membrane cavity 340', and an opening 346' formed in the bottom surface 340b' that allows for communication with the flow path 330' and opening 336' via a fluid path (not shown, but akin to the fluid path 338). The primary difference between the body 320' and the body 320 is that an outlet 342' of the body 320' is not disposed at an approximate center of the bottom surface 340b', but rather, is disposed a distance d away from the approximate center. This embodiment illustrated in FIG. 6A is merely one example of other possible configurations. As shown in FIG. 6B, by changing the distance d, the flow rate and activation pressures can be adjusted. More particularly, as shown in the graph, as the distance d increases, a flow rate increases, but so too does an activation pressure. Accordingly, in one tested configuration, when the outlet 342' was disposed at the center, the substantially constant flow rate was about 2.5 liters per hour, but as d increased to about 2.3 millimeters, about 3.3 millimeters, and about 4.3 millimeters, the substantially constant flow rate rose to about 3.0 liters per hour, about 4.0 liters per hour, and about 5.5 liters per hour, respectively. Further, when the outlet 342' was disposed at the center, the activation pressure was about 0.15 bar, but as d increased to about 2.3 millimeters, about 3.3 millimeters, and about 4.3 millimeters, the activation pressures rose to about 0.4 bar, about 0.8 bar, and about 1.65 bar, respectively.

A person skilled in the art, in view of the present disclosures, will understand a variety of parameters of the drip irrigation emitters disclosed herein can be modified to help optimize the performance based on the teachings herein. For example, parameters that can be modified include a distance F' between the outlet 342' and the opening 346', a depth md' of the membrane cavity 340', and a thickness of the membrane. In one prototype having a substantially flat bottom like the emitter design shown in FIG. 6A, those values were: F'=4.3 millimeters, which allowed for the outlet 342' to be at the approximate center of the cavity 340', md'=1.0 millimeter, and membrane thickness=1.4 millimeters. In a second prototype having a substantially flat bottom like the emitter design shown in FIG. 4A, those values were: F'=6.6 millimeters, md'=1.35 millimeters, and membrane thickness=1.2 millimeters. More generally, the ranges of those values can depend on a variety of factors, including but not limited to the intended use of the emitter, the size and shape of various components of the emitter and/or of other components with which the emitter will be used (e.g., other emitters, tubing to which the emitter is attached, etc.), and factors associated with the environment in which the emitter will be used. Some non-limiting ranges for those values include the distance F' approximately in the range of about 2 millimeter to about 15 millimeters, the depth md' approximately in the range of about 0.5 millimeters to about 2.5 millimeters, and the membrane thickness approximately in the range of about 0.5 millimeters to about 2.5 millimeters.

FIGS. 7A-7D illustrate yet another exemplary embodiment of a body 420 of a drip irrigation emitter. The body 420 includes a flow path 430 formed therein, the flow path 430 being in fluid communication with a membrane cavity 440 via a fluid path 438 extending between an opening 436 formed at a terminal exit point 434 of the flow path 430 and an opening 446 formed in the membrane cavity 440. The flow path 430 can include a terminal entry point 432 that is in fluid communication with an inlet, such as an inlet formed in a cover of the emitter (not shown, but akin to the inlet 62 and cover 60 of the emitter 10).

The membrane cavity 440 includes an outlet 442 that is in fluid communication with an outside environment. As shown, the outlet 442 is disposed in an approximate center of a bottom surface 440b of the cavity 440 and includes an elongate configuration, sometimes referred to as a slot or elongate slot, shown as an outlet center 442c having opposed outlet wings 442a, 442b extending therefrom. Unlike the cavity 40 of the emitter 10, the membrane cavity 440 does not include a land (e.g., land 44) or a channel (e.g., channel 48). Instead, the bottom surface 440b of the membrane cavity 440 has a rectangular prism shape with a substantially flat bottom. The outlet 442 is not a channel because it extends through a terminal bottom end 420b of the body 420, and thus it does not have a bottom defined by the bottom surface 440b of the cavity 440. While in the illustrated embodiment a width of both the wings 442a, 442b is less than a diameter of the center 442c, in other embodiments the width of both the wings 442a, 442b can be equal to or greater than a diameter of the center 442c and/or the widths of the wings 442a, 442b may not be the same. That is, the wings 442a, 442b and center 442c can be substantially symmetrical or asymmetrical with respect to each other. Thus, in some instances, one wing 442a, 442b may be less than, equal to, or greater than a diameter of the center 442c while the other wing 442a, 442b is one of the other of less than, equal to, or greater than a diameter of the center 442c. Although the outlet 442 having the elongate configuration is illustrated with respect to an embodiment in which the bottom surface 440b of the cavity 440 is substantially flat, a person skilled in the art will appreciate that such an outlet configuration can be used in other shaped membrane cavities, including but not limited to the cavities 140, 240, and 340. Likewise, while in the illustrated embodiment the outlet 442 is substantially symmetrical and substantially centered with respect to the membrane cavity 440 and its bottom surface 440b, in other embodiments it can be asymmetrical with respect to the membrane cavity 440 and/or its bottom surface 440b. In the illustrated embodiment, a ledge 441 is formed as part of the cavity 440. A membrane (not shown, but akin to the membrane 50) can sit or otherwise be coupled to the ledge 441.

As water flows into the cavity 440, and a membrane (not shown) depresses towards the bottom surface 440b, an activation pressure is generated within the cavity 440 that pumps the water through the rectangular prism shape and substantially flat bottom of the cavity 440 and through the outlet 442 to an outside environment (e.g., a root zone near a plant). While the size and shape of the membrane cavity 440 will depend on a variety of factors, including but not limited to the intended use, the size and shape of other components of the emitter (e.g., the flow path, the membrane, etc.) and/or components with which it will be used (e.g., other emitters, tubing to which the emitter is attached, etc.), and factors associated with the environment in which the emitter will be used, in some embodiments, the maximum depth md''' can be approximately in the range of about 0.5 millimeters to about 8.0 millimeters, or approximately in the range of about 2.0 millimeter to about 3.25 millimeters, and in some embodiments, it can be approximately 2.75 millimeter. Alternatively, or additionally, a maximum depth, sometimes referred to herein as a second maximum depth, can be measured from a top surface of the ledge 441 to a bottom portion of the cavity, akin to the bottom portion illustrated for the maximum depth md''. The maximum depth for that measurement can be approximately in the range of about 0.10 millimeters to about 5.0 millimeters, or approximately in the range of about 1.0 millimeter to about 3.0 millimeters, and in some embodiments, it can be about 1.0 millimeter. A person skilled in the art will be able to determine commensurate lengths l of the outlet 442 extending from opposed terminal ends of the wings 442a, 442b based on the other dimensions provided for herein and the other factors that can impact the dimensions of the present disclosure, such as intended use, size of other components, etc. Aspects such as the sizes and locations of the outlet 442, the opening 446, the maximum depth md''', and the second maximum depth can be altered without departing from the spirit of the present disclosure.

Figure 7E:
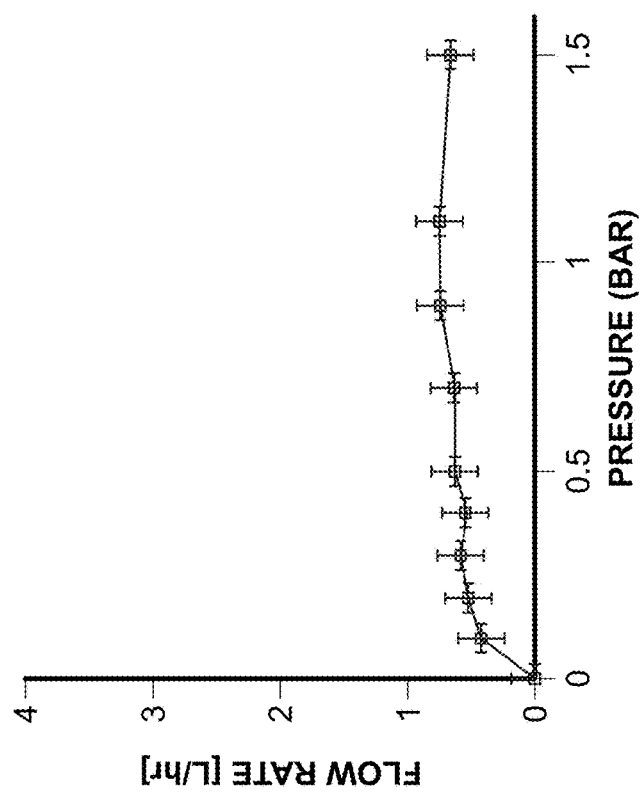
FIG. 7E is a graph that plots an activation pressure against a flow rate for the body of FIG. 7A.

As shown in FIG. 7E, the longer outlet 442 allows for an activation pressure that is still less than many existing activation pressures—as shown, it is approximately 0.2 bar—and achieves a substantially constant flow rate of about 1 liter per hour. A similar activation pressure can likely be achieved with other flow rates, such as flow rates approximately in the range of about 0.5 liters per hour to about 3.0 liters per hour, by making slight variations to the geometry. Such modifications will be understood by a person skilled in the art in view of the present disclosures.

Figure 7F:
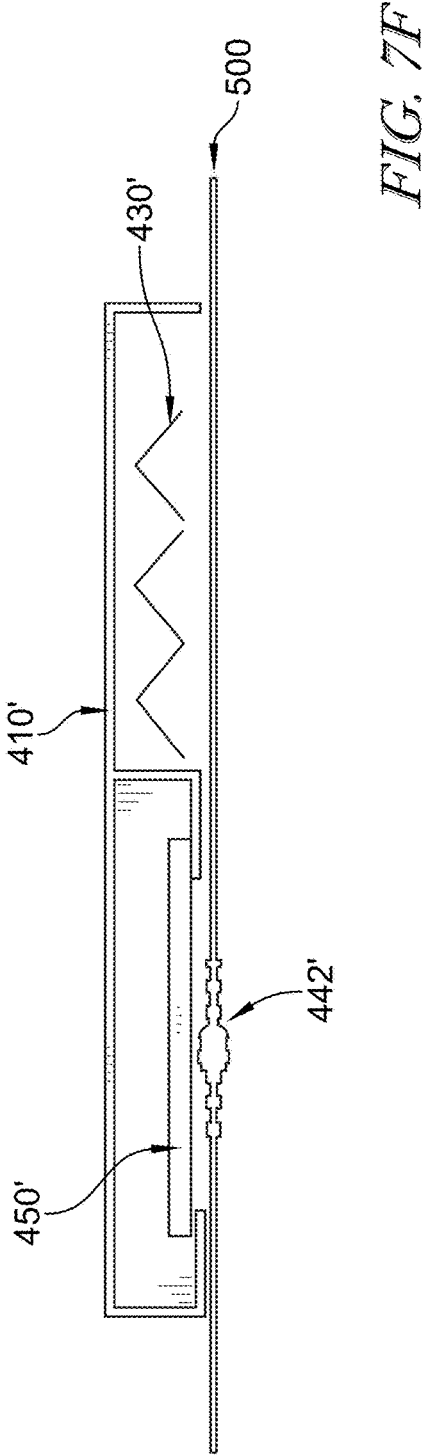
FIG. 7F is a schematic side view of an alternative body of a PC drip emitter that includes a membrane cavity having a flat configuration with a long outlet formed therein.

FIG. 7F illustrates a similar body 420' as part of an emitter 410' disposed on irrigation tubing, for example, as shown, a pipe 500. The embodiment provides for a two-piece manufacturing configuration. In the illustrated embodiment, an outlet 442' is formed directly in the pipe 500 rather than in the emitter 410' itself. A flow path 430' operates in manners akin to those described above, as does a membrane or flexible diaphragm 450', except the membrane 450' bends against the pipe 500 itself. As illustrated, the body 420' can be formed from polyethylene, among other materials. Moreover, the wall of the pipe 500 may be utilized as a seal. The present embodiment allows for the elimination of a cap of a drip emitter by cutting a 2D pressure compensating feature into the emitter. Alternatively, the emitter can also be made in a similar manner as conventional architectures with three pieces. A person skilled in the art will recognize the various materials that can be used to make the various components of emitters and/or bodies of emitters without departing from the spirit of the present disclosure.

Examples of the above-described embodiments can include the following:

1. A drip irrigation emitter, comprising:
   an inlet;
   a body;
   a membrane cavity formed in the body, the membrane cavity having an opening formed therein;
   an outlet in fluid communication with the membrane cavity;
   a membrane disposed above a bottom surface of the membrane cavity; and
   a flow path formed in the body, the flow path having an entry point that is in fluid communication with the inlet and an exit point that is in fluid communication with the opening formed in the membrane cavity, the flow path being configured to decrease a pressure of fluid flowing therethrough as it passes from the entry point to the exit point, wherein the membrane cavity is devoid of a channel through which fluid passes as it moves from the membrane cavity, through the outlet, and to an outside environment.

2. The drip irrigation emitter of claim 1, wherein the bottom surface of the membrane cavity comprises a sinusoidal shape having each of the opening and the outlet associated therewith.

3. The drip irrigation emitter of claim 2, wherein a maximum depth of the sinusoidal shape is approximately in the range of about 0.5 millimeters to about 3.0 millimeters.

4. The drip irrigation emitter of claim 3, wherein the maximum depth is approximately 1.5 millimeters.

5. The drip irrigation emitter of claim 2, wherein the opening and the outlet are disposed on opposed sides of an approximate center of the bottom surface of the membrane cavity.

6. The drip irrigation emitter of claim 1, wherein the bottom surface of the membrane cavity comprises a cylindrical shape having each of the opening and the outlet associated therewith.

7. The drip irrigation emitter of claim 6, wherein a maximum depth of the cylindrical shape is approximately in the range of about 0.5 millimeters to about 3.0 millimeters.

8. The drip irrigation emitter of claim 7, wherein the maximum depth is approximately 0.9 millimeters.

9. The drip irrigation emitter of claim 6, wherein the opening and the outlet are disposed kitty-corner with respect to each other, off-center from an approximate center of the bottom surface of the membrane cavity.

10. The drip irrigation emitter of claim 1, wherein the bottom surface of the membrane cavity is substantially flat across its surface area and has each of the opening and the outlet associated therewith.

11. The drip irrigation emitter of claim 10, wherein a maximum depth of the membrane cavity is approximately in the range of about 0.5 millimeters to about 3.0 millimeters.

12. The drip irrigation emitter of claim 11, wherein the maximum depth is approximately 1.0 millimeters.

13. The drip irrigation emitter of any of claims 10 to 12, wherein the opening is offset from an approximate center of the bottom surface of the membrane and the outlet is disposed at the approximate center of the bottom surface of the membrane cavity.

14. The drip irrigation emitter of any of claims 1 to 4, 6 to 8, and 10 to 13, wherein the outlet comprises an elongate slot having wings extending from opposed sides of a center of the outlet.

15. The drip irrigation emitter of any of claims 10 to 12, wherein each of the opening and the outlet is offset from an approximate center of the bottom surface of the membrane cavity.

16. The drip irrigation emitter of any of claims 1 to 15, wherein an activation pressure of the emitter is approximately in the range of about 0.1 bar to about 0.3 bar.

17. The drip irrigation emitter of claim 16, wherein the activation pressure is approximately 0.15 bar.

18. The drip irrigation emitter of any of claims 1 to 17, wherein a flow rate of the emitter once activated is approximately in the range of about 0.1 liters per hour to about 8.0 liters per hour.

19. The drip irrigation emitter of claim 18, wherein the flow rate of the emitter once activated is approximately in the range of about 2.5 liters per hour to about 3.0 liters per hour.

20. The drip irrigation emitter of any of claims 1 to 19, further comprising a cover coupled to the body, the inlet being disposed in the cover.

21. The drip irrigation emitter of any of claims 1 to 20, wherein the bottom surface of the membrane cavity is devoid of a land.

22. A method of dispensing fluid at a substantially constant flow rate, comprising:
   passing fluid through a flow path of a drip irrigation emitter, thereby decreasing a pressure of the fluid;
   passing the fluid from the flow path into a membrane cavity; and
   applying a force to the fluid in the membrane cavity to pass the fluid out of an outlet in fluid communication with the membrane cavity without the fluid passing through a channel disposed in the membrane cavity.

23. The method of claim 22, wherein a bottom surface of the membrane cavity comprises a sinusoidal shape having each of an opening in fluid communication with the flow path and the outlet associated therewith.

24. The method of claim 22, wherein a bottom surface of the membrane cavity comprises a cylindrical shape having each of an opening in fluid communication with the flow path and the outlet associated therewith.

25. The method of claim 22, wherein a bottom surface of the membrane cavity is substantially flat across its surface area and has each of an opening in fluid communication with the flow path and the outlet associated therewith.

26. The method of any of claims 22 to 25, wherein the outlet comprises an elongate slot having wings extending from opposed sides of a center of the outlet.

27. The method of any of claims 22 to 26, wherein a substantially constant flow rate is achieved with an activation pressure approximately in the range of about 0.1 bar to about 0.3 bar.

28. The method of claim 27, wherein the activation pressure is approximately 0.15 bar.

29. The method of any of claims 22 to 28, wherein a substantially constant flow rate through the outlet once activated is approximately in the range of about 0.1 liters per hour to about 8.0 liters per hour.

30. The method of claim 29, wherein the substantially constant flow rate through the outlet once activated is approximately in the range of about 2.5 liters per hour to about 3.0 liters per hour.

31. The method of any of claims 22 to 30, wherein a bottom surface of the membrane cavity is devoid of a land.

One skilled in the art will appreciate further features and advantages of the disclosure based on the above-described embodiments. Accordingly, the disclosure is not to be limited by what has been particularly shown and described, except as indicated by the appended claims. For example, while the present embodiments often include a single feature (e.g., an inlet, an outlet, an opening, a flow path, etc.), it is possible that multiple of the same features (e.g., two or more inlets, two or more outlets, two or more openings, two or more flow paths, etc.) can be incorporated into the design of an emitter without departing from the spirit of the present disclosure. Additional information about the design of emitters of the present disclosure that can be utilized in conjunction with the present disclosures includes the information contained in a U.S. Provisional Patent Application Ser. No. 63/065,491 entitled "Systems and Methods for Designing and Modeling Pressure-Compensating Drip Emitters, and Improved Devices in view of the Same," filed Aug. 13, 2020, and a U.S. Nonprovisional patent application entitled "Systems and Methods for Designing and Modeling Pressure-Compensating Drip Emitters, and Improved Devices in view of the Same," filed concurrently with the present application, and the contents of each which is incorporated herein by reference in its entirety.

Some non-limiting claims that are supported by the contents of the present disclosure are provided below.

What is claimed is:

1. A drip irrigation emitter, comprising:
   an inlet;
   a body;
   a membrane cavity formed in the body, the membrane cavity having an opening formed therein;
   an outlet in fluid communication with the membrane cavity;
   a membrane disposed above a bottom surface of the membrane cavity, the bottom surface of the membrane cavity having each of the opening and the outlet associated therewith, the opening and the outlet being disposed on opposed sides of the bottom surface of the membrane cavity; and
   a flow path formed in the body, the flow path having an entry point that is in fluid communication with the inlet and an exit point that is in fluid communication with the opening formed in the membrane cavity, the flow path being configured to decrease a pressure of fluid flowing therethrough as it passes from the entry point to the exit point,
   wherein the membrane cavity is devoid of a channel through which fluid passes as it moves from the membrane cavity, to the outlet, and to an outside environment.

2. The drip irrigation emitter of claim 1, wherein the bottom surface of the membrane cavity comprises a sinusoidal shape.

3. The drip irrigation emitter of claim 1, wherein the bottom surface of the membrane cavity comprises a cylindrical shape having each of the opening and the outlet associated therewith.

4. The drip irrigation emitter of claim 3, wherein the opening and the outlet are disposed kitty-corner with respect to each other, off-center from an approximate center of the bottom surface of the membrane cavity.

5. The drip irrigation emitter of claim 1, wherein the bottom surface of the membrane cavity is substantially flat across its surface area and has each of the opening and the outlet associated therewith.

6. The drip irrigation emitter of claim 5, wherein the opening is disposed a first distance from an approximate center of the bottom surface of the membrane and the outlet is disposed a second distance from the approximate center, the first distance and the second distance not being equal to each other.

7. The drip irrigation emitter of claim 1, wherein the outlet comprises an elongate slot having wings extending from opposed sides of a center of the outlet.

8. The drip irrigation emitter of claim 1, wherein an activation pressure of the emitter is approximately in the range of 0.1 bar to 0.3 bar.

9. The drip irrigation emitter of claim 1, wherein a flow rate of the emitter once activated is approximately in the range of 0.1 liters per hour to 8.0 liters per hour.

10. The drip irrigation emitter of claim 1, wherein the outlet is configured to discharge fluid from the membrane cavity directly to an outside environment at all activation pressures.

11. The drip irrigation emitter of claim 1, wherein the fluid path is the same path of travel for fluid at all activation pressures.

12. The drip irrigation emitter of claim 11, wherein the channel is configured to receive the membrane to increase flow resistance.

13. The drip irrigation emitter of claim 1, wherein the channel has a fluid flow path that is substantially parallel to a bottom surface of the membrane when the membrane is in an undeformed state.

14. The drip irrigation emitter of claim 1, wherein the membrane is configured to deflect into the membrane cavity to create a substantially constant flow rate without deflecting into a channel formed within a surface the defines the membrane cavity, the channel having a fluid flow path that is substantially parallel to a bottom surface of the membrane when the membrane is in an undeformed state.

15. The drip irrigation emitter of claim 1,
   wherein the bottom surface includes a first central axis extending in a longitudinal direction of the bottom surface and a second central axis substantially perpendicular to the first central axis and extending in the lateral direction, and wherein the opening and the outlet are disposed on opposed sides of the second central axis and are substantially aligned with the first central axis.

16. The drip irrigation emitter of claim 15, wherein the first and second central axes each extend along the bottom surface and bisect the bottom surface.

17. The drip irrigation emitter of claim 1,
wherein the body includes a top body surface and a bottom body surface opposite the top body surface, and
wherein the flow path and the membrane cavity are formed as recesses in the top body surface of the body.

18. The drip irrigation emitter of claim 1, wherein the bottom surface is devoid of a land formed on and raising away from the bottom surface.

* * * * *